US012739608B2

(12) United States Patent
Xu et al.

(10) Patent No.: US 12,739,608 B2
(45) Date of Patent: Sep. 15, 2026

(54) CELLULAR ASSISTED SIDELINK DISCOVERY

(71) Applicant: QUALCOMM INCORPORATED, San Diego, CA (US)

(72) Inventors: Huilin Xu, Temecula, CA (US); Kapil Gulati, Belle Mead, NJ (US); Hong Cheng, Basking Ridge, NJ (US); Peng Cheng, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 151 days.

(21) Appl. No.: 18/257,552

(22) PCT Filed: Mar. 2, 2021

(86) PCT No.: PCT/CN2021/078613

§ 371 (c)(1),
(2) Date: Jun. 14, 2023

(87) PCT Pub. No.: WO2022/183359

PCT Pub. Date: Sep. 9, 2022

(65) Prior Publication Data

US 2024/0114330 A1 Apr. 4, 2024

(51) Int. Cl.

| | |
|---|---|
| ***H04W 8/00*** | (2009.01) |
| ***H04W 76/14*** | (2018.01) |
| ***H04W 92/18*** | (2009.01) |

(52) U.S. Cl.

CPC ............ *H04W 8/005* (2013.01); *H04W 76/14* (2018.02); *H04W 92/18* (2013.01)

(58) Field of Classification Search

CPC .. H04B 7/0695; H04B 7/088; H04B 7/06952; H04W 76/27; H04W 76/14;

(Continued)

(56) References Cited

U.S. PATENT DOCUMENTS

| | | | | |
|---|---|---|---|---|
| 11,252,753 | B2 * | 2/2022 | Chen | H04W 72/23 |
| 11,438,877 | B2 * | 9/2022 | Luo | H04B 17/318 |

(Continued)

FOREIGN PATENT DOCUMENTS

| | | |
|---|---|---|
| CN | 111699742 A | 9/2020 |
| KR | 20150033578 A | 4/2015 |

OTHER PUBLICATIONS

3GPP TSG-RAN WG2 Meeting #97bis Title: Discussion on UE capability reporting for V2X R2-1702501 (Year: 2017).*

(Continued)

*Primary Examiner* — Nizar N Sivji
(74) *Attorney, Agent, or Firm* — Holland & Hart LLP/QUALCOMM Incorporated

(57) ABSTRACT

Methods, systems, and devices for wireless communications are described. In some systems, a user equipment (UE) may support cellular communications (e.g., Uu signaling) in a first frequency range and may support sidelink communications in a second, higher frequency range. To reduce the processing overhead and latency involved in sidelink discovery in the second frequency range, the UE may use Uu signaling in the first frequency range to assist with the sidelink discovery. For example, the UE may determine, based on a configuration, an uplink message supporting UE detection in the first frequency range to support sidelink discovery. The UE may monitor for the uplink message in the first frequency range and may detect a second UE based on the monitoring. The UEs may establish a sidelink connection for sidelink communications in the second frequency range based on the detection of the second UE in the first frequency range.

30 Claims, 16 Drawing Sheets

(58) Field of Classification Search

CPC . H04W 72/0453; H04W 8/005; H04W 92/18; H04W 72/20; H04W 24/08; H04W 72/0446; H04W 72/25

See application file for complete search history.

(56) References Cited

U.S. PATENT DOCUMENTS

| | | | | |
|---|---|---|---|---|
| 11,876,624 | B2 * | 1/2024 | Kim | H04L 1/1887 |
| 2014/0003262 | A1 | 1/2014 | He et al. | |
| 2014/0206322 | A1 * | 7/2014 | Dimou | H04W 4/70 455/414.1 |
| 2016/0044552 | A1 * | 2/2016 | Heo | H04W 76/14 370/331 |
| 2018/0035279 | A1 * | 2/2018 | Fujishiro | H04W 72/0453 |
| 2019/0274121 | A1 * | 9/2019 | Wu | H04L 5/0092 |
| 2020/0092685 | A1 * | 3/2020 | Fehrenbach | H04W 72/23 |
| 2020/0113015 | A1 * | 4/2020 | Basu Mallick | H04W 52/0216 |
| 2020/0260353 | A1 * | 8/2020 | Xu | H04W 76/27 |
| 2020/0260463 | A1 * | 8/2020 | Lovlekar | H04W 76/15 |
| 2020/0305202 | A1 | 9/2020 | Zhang et al. | |
| 2020/0322774 | A1 | 10/2020 | Vargas et al. | |
| 2020/0413393 | A1 | 12/2020 | Luo et al. | |
| 2021/0007122 | A1 | 1/2021 | Takeda et al. | |
| 2021/0127385 | A1 * | 4/2021 | Kung | H04L 5/0007 |
| 2021/0337517 | A1 * | 10/2021 | Li | H04W 8/24 |
| 2022/0236365 | A1 * | 7/2022 | Ko | G01S 7/006 |

OTHER PUBLICATIONS

WO_2016108680_A1 (Year: 2016).*

EP_4164327_A1 (Year: 2016).*

3GPP TSG RAN WG1 #100 bis-e R1-200xxxx (Year: 2000).*

International Search Report and Written Opinion—PCT/CN2021/078613—ISA/EPO—Nov. 30, 2021.

Nokia, et al., "Issues in D2D Discovery Signal Design", 3GPP Draft, 3GPP TSG-RAN WG1 Meeting #76bis, R1-141539, Shenzhen, China, Mar. 31-Apr. 4, 2014, 5 Pages.

Supplementary European Search Report—EP219284502—Search Authority—The Hague—Oct. 22, 2024.

* cited by examiner

300

500

900

1100

CELLULAR ASSISTED SIDELINK DISCOVERY

CROSS REFERENCE

The present application is a 371 national stage filing of International PCT Application No. PCT/CN2021/078613 by XU et al. entitled "CELLULAR ASSISTED SIDELINK DISCOVERY," filed Mar. 2, 2021, which is assigned to the assignee hereof, and which is expressly incorporated by reference in its entirety herein.

INTRODUCTION

The following relates to wireless communications, including techniques for sidelink discovery.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

A method for wireless communications at a first UE is described. The method may include determining, based on a configuration of the first UE, an uplink message supporting UE detection for sidelink discovery and monitoring for the uplink message in a first frequency range. The method may further include detecting a second UE based on the monitoring and communicating a sidelink message with the second UE in a second frequency range different from the first frequency range based on detecting the second UE.

An apparatus for wireless communications at a first UE is described. The apparatus may include a processor and memory coupled to the processor, the processor and memory configured to determine, based on a configuration of the first UE, an uplink message supporting UE detection for sidelink discovery and monitor for the uplink message in a first frequency range. The processor and memory may be further configured to detect a second UE based on the monitoring and communicate a sidelink message with the second UE in a second frequency range different from the first frequency range based on detecting the second UE.

Another apparatus for wireless communications at a first UE is described. The apparatus may include means for determining, based on a configuration of the first UE, an uplink message supporting UE detection for sidelink discovery and means for monitoring for the uplink message in a first frequency range. The apparatus may further include means for detecting a second UE based on the monitoring and means for communicating a sidelink message with the second UE in a second frequency range different from the first frequency range based on detecting the second UE.

A non-transitory computer-readable medium storing code for wireless communications at a first UE is described. The code may include instructions executable by a processor to determine, based on a configuration of the first UE, an uplink message supporting UE detection for sidelink discovery and monitor for the uplink message in a first frequency range. The code may further include instructions executable by the processor to detect a second UE based on the monitoring and communicate a sidelink message with the second UE in a second frequency range different from the first frequency range based on detecting the second UE.

Some examples of the method, apparatuses, and non-transitory computer-readable medium described herein may further include operations, features, means, or instructions for receiving, from a base station, a configuration message indicating the uplink message supporting UE detection for sidelink discovery, the determining based on the configuration message.

In some examples of the method, apparatuses, and non-transitory computer-readable medium described herein, the configuration message includes a flag indicating that the uplink message supports UE detection for sidelink discovery, a time domain resource configuration for the uplink message, a frequency domain resource configuration for the uplink message, a signal generation configuration for the uplink message, a detection threshold for detecting the uplink message, or a combination thereof.

In some examples of the method, apparatuses, and non-transitory computer-readable medium described herein, the configuration message includes a radio resource control (RRC) configuration message.

In some examples of the method, apparatuses, and non-transitory computer-readable medium described herein, the first UE may be pre-configured with the configuration of the first UE indicating the uplink message supporting UE detection for sidelink discovery.

In some examples of the method, apparatuses, and non-transitory computer-readable medium described herein, the configuration of the first UE indicates that the uplink message supports UE detection for sidelink discovery, a time domain resource configuration for the uplink message, a frequency domain resource configuration for the uplink message, a signal generation configuration for the uplink message, a detection threshold for detecting the uplink message, or a combination thereof.

Some examples of the method, apparatuses, and non-transitory computer-readable medium described herein may further include operations, features, means, or instructions for determining that the uplink message corresponds to the second UE based on a UE-specific configuration for the uplink message supporting UE detection for sidelink discovery.

Some examples of the method, apparatuses, and non-transitory computer-readable medium described herein may further include operations, features, means, or instructions for determining that the uplink message corresponds to at least one UE of a set of multiple UEs based on a common configuration for the set of multiple UEs for the uplink message supporting UE detection for sidelink discovery, the set of multiple UEs including at least the second UE.

Some examples of the method, apparatuses, and non-transitory computer-readable medium described herein may further include operations, features, means, or instructions for triggering a sidelink discovery procedure in the second frequency range based on detecting the second UE and establishing a sidelink connection with the second UE based on the sidelink discovery procedure, the sidelink message being communicated with the second UE via the established sidelink connection.

Some examples of the method, apparatuses, and non-transitory computer-readable medium described herein may further include operations, features, means, or instructions for detecting the uplink message using a first communication beam in the first frequency range based on the monitoring and performing a beam sweeping procedure using a set of second communication beams in the second frequency range based on the triggered sidelink discovery procedure, the first communication beam including a first beam width that is greater than each beam width for the set of second communication beams.

In some examples of the method, apparatuses, and non-transitory computer-readable medium described herein, the establishing the sidelink connection with the second UE may include operations, features, means, or instructions for transmitting a sidelink connection request to the second UE based on detecting the second UE and receiving a sidelink connection response from the second UE in response to the sidelink connection request.

In some examples of the method, apparatuses, and non-transitory computer-readable medium described herein, the establishing the sidelink connection with the second UE may include operations, features, means, or instructions for transmitting, to a base station, a connection request indicating the second UE based on detecting the second UE and receiving, from the base station, a connection response indicating the second UE in response to the connection request.

In some examples of the method, apparatuses, and non-transitory computer-readable medium described herein, the monitoring may include operations, features, means, or instructions for detecting the uplink message based on a signal metric for the uplink message satisfying a signal metric threshold, the second UE being detected based on detecting the uplink message.

In some examples of the method, apparatuses, and non-transitory computer-readable medium described herein, the signal metric includes a reference signal received power (RSRP), a signal-to-noise ratio (SNR), a received signal strength indicator (RSSI), or a combination thereof.

Some examples of the method, apparatuses, and non-transitory computer-readable medium described herein may further include operations, features, means, or instructions for monitoring for an additional uplink message in the first frequency range, the monitoring for the uplink message and the monitoring for the additional uplink message being based on a configured time domain pattern for at least the uplink message and the additional uplink message.

In some examples of the method, apparatuses, and non-transitory computer-readable medium described herein, the uplink message includes a sounding reference signal (SRS), a random access channel (RACH) preamble, a physical uplink shared channel (PUSCH) message, a physical uplink control channel (PUCCH) message, an uplink demodulation reference signal (DMRS), or a combination thereof.

In some examples of the method, apparatuses, and non-transitory computer-readable medium described herein, the first UE and the second UE support Uu communications in the first frequency range and the first UE and the second UE support sidelink communications in the second frequency range.

In some examples of the method, apparatuses, and non-transitory computer-readable medium described herein, the first frequency range includes Frequency Range 1 (FR1) and the second frequency range includes Frequency Range 2 (FR2).

A method for wireless communications at a base station is described. The method may include transmitting, to at least a first UE, a configuration message indicating an uplink message supporting UE detection for sidelink discovery and receiving, from a second UE, the uplink message, the uplink message supporting sidelink discovery of the second UE at the first UE based on the configuration message.

An apparatus for wireless communications at a base station is described. The apparatus may include a processor and memory coupled to the processor, the processor and memory configured to transmit, to at least a first UE, a configuration message indicating an uplink message supporting UE detection for sidelink discovery and receive, from a second UE, the uplink message, the uplink message supporting sidelink discovery of the second UE at the first UE based on the configuration message.

Another apparatus for wireless communications at a base station is described. The apparatus may include means for transmitting, to at least a first UE, a configuration message indicating an uplink message supporting UE detection for sidelink discovery and means for receiving, from a second UE, the uplink message, the uplink message supporting sidelink discovery of the second UE at the first UE based on the configuration message.

A non-transitory computer-readable medium storing code for wireless communications at a base station is described. The code may include instructions executable by a processor to transmit, to at least a first UE, a configuration message indicating an uplink message supporting UE detection for sidelink discovery and receive, from a second UE, the uplink message, the uplink message supporting sidelink discovery of the second UE at the first UE based on the configuration message.

Some examples of the method, apparatuses, and non-transitory computer-readable medium described herein may further include operations, features, means, or instructions for receiving, from the first UE, a connection request indicating the second UE based on the uplink message and transmitting, to the second UE, the connection request in response to receiving the connection request. Some such examples of the method, apparatuses, and non-transitory computer-readable medium described herein may further include operations, features, means, or instructions for receiving, from the second UE, a connection response in response to transmitting the connection request and transmitting, to the first UE, the connection response in response to receiving the connection request, the connection response supporting a sidelink connection between the first UE and the second UE.

In some examples of the method, apparatuses, and non-transitory computer-readable medium described herein, the transmitting may include operations, features, means, or instructions for transmitting the configuration message to the first UE and the second UE, the uplink message being received from the second UE based on the configuration message.

In some examples of the method, apparatuses, and non-transitory computer-readable medium described herein, the configuration message indicates a UE-specific configuration for the second UE, the uplink message supporting detection of the second UE based on the UE-specific configuration.

In some examples of the method, apparatuses, and non-transitory computer-readable medium described herein, the configuration message indicates a common configuration for a set of multiple UEs including at least the second UE, the uplink message supporting detection of at least one UE of the set of multiple UEs based on the common configuration.

In some examples of the method, apparatuses, and non-transitory computer-readable medium described herein, the configuration message includes a flag indicating that the uplink message supports UE detection for sidelink discovery, a time domain resource configuration for the uplink message, a frequency domain resource configuration for the uplink message, a signal generation configuration for the uplink message, a detection threshold for detecting the uplink message, or a combination thereof.

In some examples of the method, apparatuses, and non-transitory computer-readable medium described herein, the configuration message includes an RRC configuration message.

Another method for wireless communications at a first UE is described. The method may include determining an uplink message supporting detection of the first UE for sidelink discovery and transmitting, to a base station, the uplink message in a first frequency range. The method may further include communicating a sidelink message with a second UE in a second frequency range different from the first frequency range based on the uplink message supporting detection of the first UE for sidelink discovery.

An apparatus for wireless communications at a first UE is described. The apparatus may include a processor and memory coupled to the processor, the processor and memory configured to determine an uplink message supporting detection of the first UE for sidelink discovery and transmit, to a base station, the uplink message in a first frequency range. The processor and memory may be further configured to communicate a sidelink message with a second UE in a second frequency range different from the first frequency range based on the uplink message supporting detection of the first UE for sidelink discovery.

Another apparatus for wireless communications at a first UE is described. The apparatus may include means for determining an uplink message supporting detection of the first UE for sidelink discovery and means for transmitting, to a base station, the uplink message in a first frequency range. The apparatus may further include means for communicating a sidelink message with a second UE in a second frequency range different from the first frequency range based on the uplink message supporting detection of the first UE for sidelink discovery.

A non-transitory computer-readable medium storing code for wireless communications at a first UE is described. The code may include instructions executable by a processor to determine an uplink message supporting detection of the first UE for sidelink discovery and transmit, to a base station, the uplink message in a first frequency range. The code may further include instructions executable by the processor to communicate a sidelink message with a second UE in a second frequency range different from the first frequency range based on the uplink message supporting detection of the first UE for sidelink discovery.

Some examples of the method, apparatuses, and non-transitory computer-readable medium described herein may further include operations, features, means, or instructions for receiving, from the base station, a configuration message indicating that the uplink message supports UE detection for sidelink discovery, the determining based on the configuration message.

In some examples of the method, apparatuses, and non-transitory computer-readable medium described herein, the determining may include operations, features, means, or instructions for determining the uplink message from a configured set of uplink messages supporting UE detection for sidelink discovery based on a UE identifier for the first UE or a pseudorandom selection process or both.

DETAILED DESCRIPTION

Figure 1:
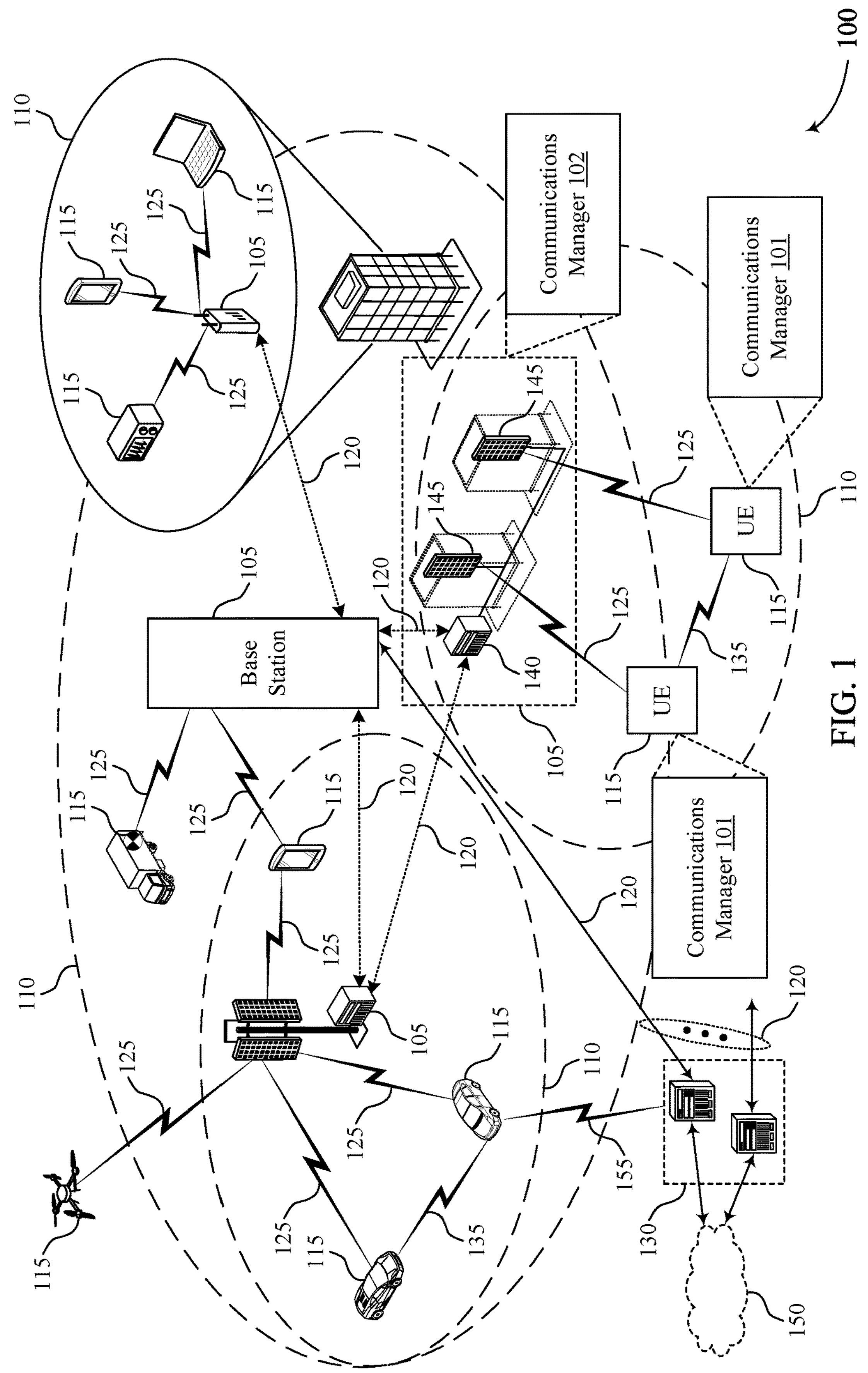
FIGS. 1 through 3 illustrate examples of wireless communications systems that support cellular assisted sidelink discovery, in accordance with one or more aspects of the present disclosure.

In some wireless communications systems, a UE may support cellular communications (e.g., Uu signaling) in a first frequency range and may support sidelink communications in a second (e.g., higher) frequency range. For example, the UE may support Uu communications in FR1 and may support sidelink communications in FR2. To establish a sidelink connection, a first UE may detect the presence of a second UE in the wireless communications system. The first UE may perform sidelink discovery for sidelink communications to discover the second UE. Sidelink discovery may involve monitoring for discovery signals from another UE using a set of communication beams. The number of communication beams and beam widths used for sidelink discovery may depend on the frequency range in which the sidelink discovery is performed. In one example, FR2 may support relatively narrower communication beams than FR1, where relatively narrower communication beams provide more directional signal transmissions than relatively wider communication beams. Accordingly, a beam sweeping procedure performed in FR1 may correspond to improved power overhead and latency as compared to a beam sweeping procedure performed in FR2, for example, based on sweeping through fewer beams to cover the same range of directions in FR1 as compared to FR2.

To improve the power and time overhead associated with sidelink discovery, a UE may use a Uu signal in a first frequency range to assist with sidelink discovery in a second (e.g., higher) frequency range. For example, a first UE may determine, based on a configuration, an uplink message supporting UE detection in the first frequency range to support sidelink discovery in the second frequency range. In some examples, the first UE may determine one or more parameters for an uplink signal to be transmitted by another UE in the first frequency range, and the first UE may monitor for the uplink signal transmitted by the other UE according to the configured one or more parameters. If the first UE detects an uplink signal with the one or more parameters, the first UE may determine that a second UE is proximate to the first UE and may trigger a sidelink discovery procedure in the second frequency range.

The UE may monitor for the uplink message in the first frequency range using a communication beam (e.g., an omnidirectional beam) or a set of communication beams with beam widths greater than the beam widths supported in the second frequency range. Accordingly, monitoring for uplink messages in the first frequency range may improve the processing overhead and latency as compared to monitoring for sidelink discovery signals in the second frequency range (e.g., based on using fewer, wider beams). The first UE may detect a second UE based on the monitoring. The first UE may trigger a sidelink discovery process in the second frequency range based on detecting the second UE in the first frequency range, such that sidelink discovery is performed based on determining that at least one UE supporting sidelink communications is proximate to the first UE. Triggering the sidelink discovery based on detecting at least one UE in the first frequency range may significantly reduce the likelihood of performing sidelink discovery when no other UE is detectable by the first UE. In some examples, the first UE may perform a partial beam sweep procedure for the sidelink discovery process based on detecting a direction associated with the second UE, further improving the processing and latency associated with sidelink discovery. The UEs may establish a sidelink connection for sidelink communications in the second frequency range based on the detection of the second UE in the first frequency range.

In some examples, a base station may configure the UEs with one or more uplink messages that support UE detection in the first frequency range to support sidelink discovery in the second frequency range. In some other examples, the UEs may be pre-configured with the configuration. The configuration may indicate a time domain resource configuration, a frequency domain resource configuration, a signal generation configuration, a detection threshold, or a combination thereof for one or more uplink messages supporting UE detection in the first frequency range. In some examples, the configuration may be UE-specific. In some other examples, the configuration may be common to multiple UEs. The first UE may use the configuration to determine one or more uplink messages for which to monitor a Uu interface. In some cases, the configuration may be transparent to the second UE transmitting the uplink message. In some other cases, the second UE may use the configuration to transmit a specific uplink message that indicates that the second UE is available for sidelink communications in the second frequency range.

Aspects of the disclosure are initially described in the context of wireless communications systems and a process flow. Aspects of the disclosure are further illustrated by and described with reference to apparatus diagrams, system diagrams, and flowcharts that relate to Uu assisted sidelink discovery.

FIG. 1 illustrates an example of a wireless communications system 100 that supports cellular assisted sidelink discovery, in accordance with one or more aspects of the present disclosure. The wireless communications system 100 may include one or more base stations 105, one or more UEs 115, and a core network 130. In some examples, the wireless communications system 100 may be an LTE network, an LTE-A network, an LTE-A Pro network, or an NR network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. A UE 115 may communicate with the core network 130 through a communication link 155.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a specific bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105. In some examples, a D2D communication link 135 may be an example of or include a sidelink (e.g., a sidelink communication channel). A UE 115 may communicate sidelink messages with another UE 115 via a sidelink connection.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example in the range of 300 megahertz (MHz) to 300 gigahertz (GHz). The region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the medium access control (MAC) layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some wireless communications systems 100, a UE 115 may support both communications with other UEs 115 and communications with a base station 105. For example, the UE 115 may communicate with a base station 105 using a communication link 125, which may be referred to as a base station link, an access link, or the like. In some cases, the communication link 125 may be referred to as the Uu interface. Additionally, the UE 115 may communicate with another UE 115 over a sidelink connection (e.g., a D2D communication link 135). Sidelink may be referred to as the PC5 interface. In some examples, a UE 115 may use a sidelink connection for local D2D communications. Additionally or alternatively, the UE 115 may use the sidelink connection for relaying messages between another UE 115 and a base station 105 to extend network coverage for the base station 105, reduce power overhead (e.g., for reduced capability UEs 115), or both. UEs 115 may support communications via a Uu interface and a PC5 interface in systems such as V2X systems, industrial IoT systems, or other wireless systems.

In some systems, specific types of communications may be deployed in specific frequency ranges. For example, Uu communications (e.g., uplink and downlink communications between a UE 115 and a base station 105) may be deployed in a first frequency range, while sidelink communications may be deployed in a second frequency range. In some cases, the first frequency range may correspond to a lower frequency band or bands than the second frequency range. For example, the first frequency range may be FR1, and the second frequency range may be FR2.

To establish a sidelink connection, a first UE 115 may detect the presence of a second UE 115 in the wireless communications system 100. The first UE 115 may perform sidelink discovery for sidelink communications to discover the second UE 115 and establish a sidelink connection with the second UE 115. Sidelink discovery may involve monitoring for discovery signals from another UE 115 using a set of communication beams. The discovery signals may be examples of announcement messages, solicitation messages, or other signals supporting detection of the presence of a UE 115. The number of communication beams and beam widths used for sidelink discovery may depend on the frequency range in which the sidelink discovery is performed. For example, FR2 may support narrower communication beams than FR1. Accordingly, a beam sweeping procedure performed in FR1 may correspond to an improved power overhead and latency as compared to a beam sweeping procedure performed in FR2 (e.g., based on sweeping through a lesser quantity of beams).

To improve the power overhead and latency associated with sidelink discovery, a UE 115 may use a Uu signal in a first frequency range to assist with sidelink discovery in a second (e.g., higher) frequency range. In one example, the UE 115 may detect a Uu signal in FR1 to support sidelink discovery in FR2, but it is to be understood that the techniques described herein may be applied to additional or alternative frequency ranges. A UE 115 may determine, based on a configuration of the UE 115, an uplink message that supports UE detection for sidelink discovery (e.g., using a communications manager 101). In some cases, the configuration is pre-configured at the UE 115. In some other cases, a base station 105, using a communications manager 102, may configure the UE 115 with the configuration. The UE 115 may monitor for the uplink message supporting UE detection in a first frequency range (e.g., FR1 or another frequency range). If another UE 115 transmits the uplink message on a Uu connection to a base station 105, the UE 115 may detect the uplink message and, correspondingly, the other UE 115 transmitting the uplink message. Because the UE 115 performs the detection in a first frequency range supporting Uu communications that is lower than a second frequency range supporting sidelink communications, the UE 115 may detect the uplink message using wider beams in the first frequency range than would be used to detect a sidelink discovery signal in the second frequency range. Based on detecting the other UE 115, the UEs 115 may establish a sidelink connection and communicate sidelink messages in the second frequency range (e.g., FR2 or another frequency range).

Figure 2:
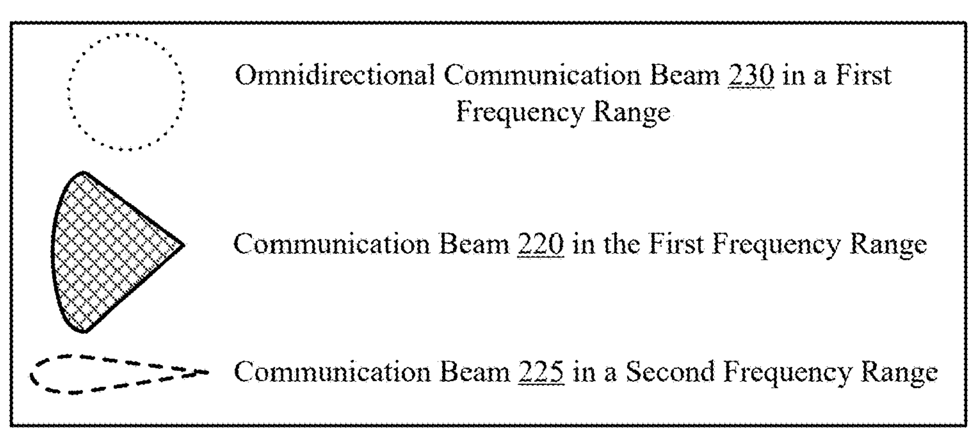
Figure 2:
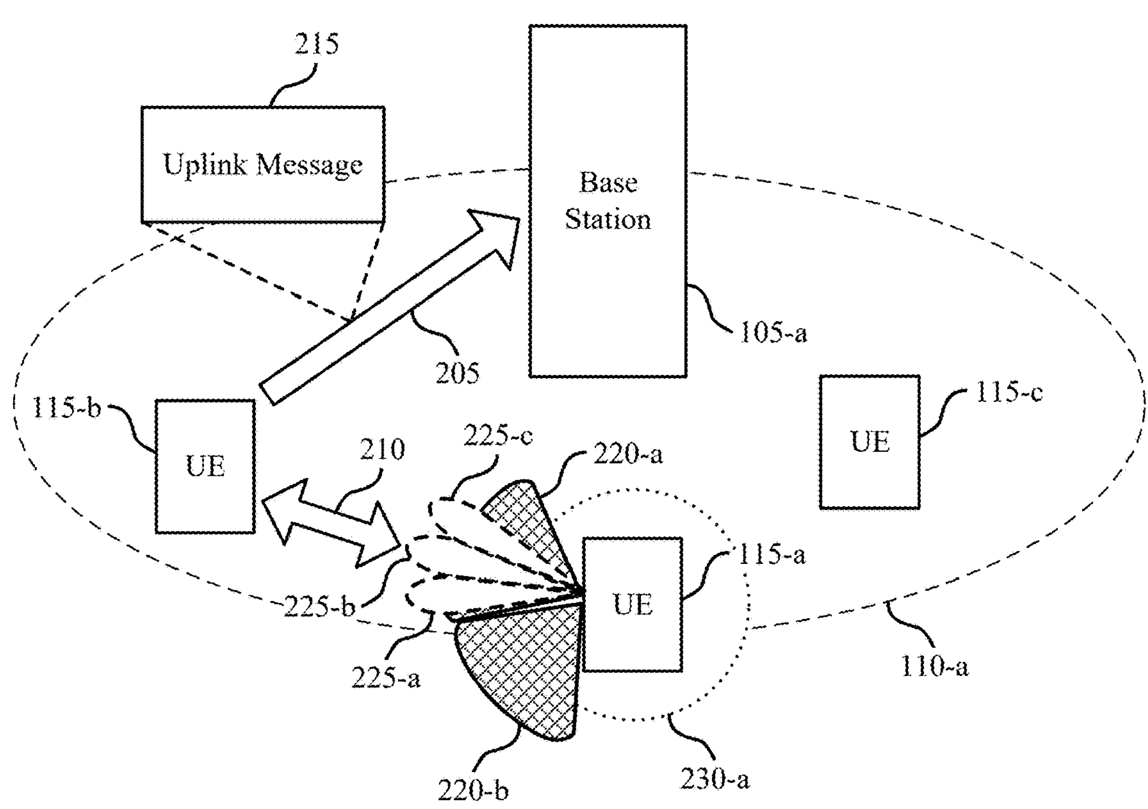

FIG. 2 illustrates an example of a wireless communications system 200 that supports cellular assisted sidelink discovery, in accordance with one or more aspects of the present disclosure. The wireless communications system 200 may be an example or include aspects of a wireless communications system 100. For example, the wireless communications system 200 may include a base station 105-*a*, a UE 115-*a*, a UE 115-*b*, and a UE 115-*c*, which may be examples of the corresponding devices described with reference to FIG. 1. The base station 105-*a* may provide services to a coverage area 110-*a*. In some examples, the UEs 115 may be configured to perform Uu communications (e.g., uplink communications, downlink communications) in a first frequency range and sidelink communications in a second frequency range different from the first frequency range. To reduce the power overhead and latency associated with sidelink discovery, a UE 115 may use one or more signals (e.g., uplink messages) transmitted in the first frequency range to assist with the sidelink discovery in the second frequency range.

A UE 115-*a* may support Uu communications in a first frequency range, such as FR1, and may support sidelink communications in a second frequency range, such as FR2. In some cases, the UE 115-*a* may further support Uu communications in the second frequency range. The UE 115-*a* may support the specific communication types in the specific frequency regions based on a pre-configuration of the UE 115-*a*, a dynamic configuration of the UE 115-*a*, a capability of the UE 115-*a*, or any combination thereof. The first frequency range may be distinct from the second frequency range or the first and second frequency ranges may partially overlap. Additionally or alternatively, the first frequency range may span a continuous set of frequency resources or may include one or more gaps in frequency, the second frequency range may span a continuous set of frequency resources or may include one or more gaps in frequency, or both.

In some other systems, a UE 115 may perform sidelink discovery in FR2. For example, the UE 115 may perform mmW communications in FR2, including beamforming according to parameters associated with FR2. Beamforming in FR2 may involve communicating using communication beams with beam widths less than a threshold beam width size. Accordingly, the communication beams supported in FR2 may be directional, such that a UE 115 may use different communication beams to communicate in different directions. For example, the UE 115 may select a communication beam from a set of multiple beams to communicate in a specific direction, where the set of multiple beams supported by the UE 115 may include a significant number of beams (e.g., 16 beams, 64 beams, or some other number of beams).

To discover another UE 115 in a sidelink discovery procedure, the UE 115 may fail to initially determine a direction in which to communicate with the other UE 115. To support discovery, the other UE 115 may transmit a set of discovery signals in a set of different directions (e.g., using a beam sweeping procedure, for example, sequentially in time). Similarly, the UE 115 may monitor for discovery signals in a set of different directions (e.g., using a beam sweeping procedure, for example, sequentially in time) to detect a discovery signal and, correspondingly, detect the presence of the other UE 115. In some examples, for each transmit beam used by one UE 115 to transmit a discovery signal, a UE 115 monitoring for the discovery signal may sweep through a set of receive beams (e.g., receive beams corresponding to the possible directions in which the signal may be detected) to determine a beam pairing between the UEs 115 for sidelink communications. Due to the beam sweeping operation and the beam widths supported for communications in FR2, the sidelink discovery procedure may involve a significant processing overhead (e.g., above a processing threshold) and latency (e.g., above a time threshold) if performed in FR2. Additionally, if the UE 115 transmitting the discovery signals is outside a detection range of the UE 115 performing the monitoring, the UEs 115 may perform the sidelink discovery procedure—involving the processing overhead and latency—and fail to detect each other.

In contrast, the wireless communications system 200 may assist sidelink discovery for sidelink communications in a second frequency range (e.g., FR2) using signaling in a first frequency range (e.g., FR1). In some cases, if a UE 115 supports sidelink communications in FR1, the UE 115 may perform sidelink discovery in FR1 and establish a sidelink connection for sidelink communications in FR2. However, in some other cases, a UE 115 may support Uu communications (e.g., cellular communications) in FR1 and sidelink communications in FR2. If the UE 115 supports Uu communications (e.g., but not sidelink communications) in FR1, the UE 115 may use Uu signaling in FR1 to assist sidelink discovery for FR2.

The UEs 115 may be configured with one or more uplink messages 215 supporting UE detection in the first frequency range. A UE 115-*a* may monitor for an uplink message 215 that supports UE detection for sidelink discovery in the first frequency range. If the UE 115-*b* transmits the uplink message 215 in the Uu spectrum (e.g., over an uplink connection 205 to the base station 105-*a*), the UE 115-*a* may detect the uplink message 215 based on the monitoring. In some cases, the uplink message may be an example of an SRS, a RACH preamble, a PUSCH message, a PUCCH message, an uplink DMRS for PUSCH or PUCCH, or some combination thereof. Additionally or alternatively, other Uu signaling may support UE detection in the first frequency range. In some examples, the UE 115-*b* may transmit the uplink message 215 as a discovery signal for the UE 115-*a*. In some other examples, the UE 115-*b* may transmit the uplink message 215 to send information to the base station 105-*a*, and the UE 115-*a* may detect the uplink message 215 and use the uplink message 215 to assist with sidelink discovery. In some examples, a UE 115-*c* not configured with the uplink message 215 supporting UE detection for sidelink discovery may not monitor for such a message and, correspondingly, may fail to detect the UE 115-*b* (e.g., in FR1).

The UE 115-*a* may detect the uplink message 215 based on a signal metric. For example, if the UE 115-*a* detects a signal corresponding to the uplink message 215 with an RSRP, an SNR, an RSSI, or some other signal metric that satisfies a threshold value, the UE 115-*a* may determine that the uplink message 215 corresponds to a UE 115-*b* within a detection range of the UE 115-*a*. The threshold value for detection may be pre-configured at the UE 115-*a* (e.g., based on one or more capabilities of the UE 115-*a*), configured by a base station 105-*a*, or dynamically determined by the UE 115-*a* (e.g., based on channel conditions or other parameters).

The UE 115-*a* may use one or more communication beams 220 in the first frequency range to monitor for the uplink message 215. A communication beam may be an example of a transmit beam (e.g., for transmitting signals), a receive beam (e.g., for receiving signals), or a combination thereof. For example, a communication beam may represent a transmit beam and a receive beam operating in a same frequency, a same direction, or both. Due to the first frequency range corresponding to lower frequencies than the second frequency range, the first frequency range may support omnidirectional communication beams 230 or communication beams 220 in the first frequency range with beam widths greater than the beams supported in the second frequency range. For example, the UE 115-*a* may monitor for the uplink message 215 using a single omnidirectional communication beam 230-*a* or a relatively small set of communication beams 220 in the first frequency range (e.g., communication beam 220-*a* and communication beam 220-*b*). Monitoring for the uplink message 215 in the first frequency range may improve latency and reduce processing overhead as compared to monitoring for a sidelink discovery signal in the second frequency range (e.g., a higher frequency range than the first frequency range). For example, based on the difference in beam widths supported by the UE 115-*a* in the first frequency range (e.g., FR1) and the second frequency range (e.g., FR2), the UE 115-*a* may monitor for signals in a set of directions using fewer communication beams 220 in the first frequency range than would be used to monitor the same set of directions using communication beams 225 in the second frequency range. Reducing the number of communication beams for monitoring may correspondingly improve the latency, processing overhead, and power consumption associated with the monitoring procedure.

If the UE 115-*a* detects another UE 115 (e.g., UE 115-*b*) in the first frequency range based on detecting the uplink message 215, the UE 115-*a* may determine that a UE 115 is within the proximity of UE 115-*a* (e.g., within a detection range or threshold). In some examples, the UE 115-*a* may trigger a sidelink discovery process in the second frequency range based on detecting the UE 115-*b* in the first frequency range. By performing the initial detection in the first frequency range, the UE 115-*a* may avoid performing sidelink discovery procedures in the second frequency range if no UEs 115 are within the detection range or threshold. For example, the UE 115-*a* may refrain from performing a sidelink discovery procedure in the second frequency range until a UE 115 is detected in the first frequency range based on a Uu signal, improving the processing overhead and latency associated with sidelink discovery.

Additionally or alternatively, the UE 115-*a* may improve the processing overhead and latency associated with sidelink discovery in the second frequency range based on detecting the UE 115-*b* in the first frequency range. For example, the UE 115-*a* may determine a direction corresponding to the detected UE 115-*b* based on the communication beam 220 in the first frequency range that detected the uplink message (e.g., with a strongest signal metric). The UE 115-*a* may reduce a beam sweeping procedure for sidelink discovery in the second frequency range based on the determined direction. For example, rather than performing beam sweeping across a full set of directions (e.g., a 360° beam sweep), the UE 115-*a* may perform the beam sweeping across a reduced set of directions associated with the determined direction corresponding to the detected UE 115-*b*. As an example, if the UE 115-*a* uses four communication beams 220 in the first frequency range for monitoring for the uplink message 215, the UE 115-*a* may use communication beams 225 in the second frequency range corresponding to beam directions within the range of the communication beam 220 that detected the UE 115-*b* with a strongest signal metric. As illustrated, the UE 115-*a* may detect the uplink message 215 using a communication beam 220-*a* in the first frequency range and may perform a beam sweeping procedure for sidelink discovery in the second frequency range using a communications beam 225-*a*, a communication beam 225-*b*, and a communication beam 225-*c* in the second frequency range. The first communication beam 220-*a* in the first frequency range may have a greater beam width than each communication beam 225 of the second set of communication beams 225 used for beam sweeping in the second frequency range. The UE 115-*a* may reduce the number of beams—and, correspondingly, improve the processing overhead and latency—by approximately 75% for the beam sweeping procedure in the second frequency range.

Based on the sidelink discovery process in the second frequency range, the UE 115-*a* may receive a sidelink discovery signal from the UE 115-*b* and determine a communication beam pair for sidelink communications between the UE 115-*a* and the UE 115-*b*. The UE 115-*a* and the UE 115-*b* may establish a sidelink connection 210 and may communicate one or more sidelink messages over the sidelink connection 210 in the second frequency range.

Figure 3:
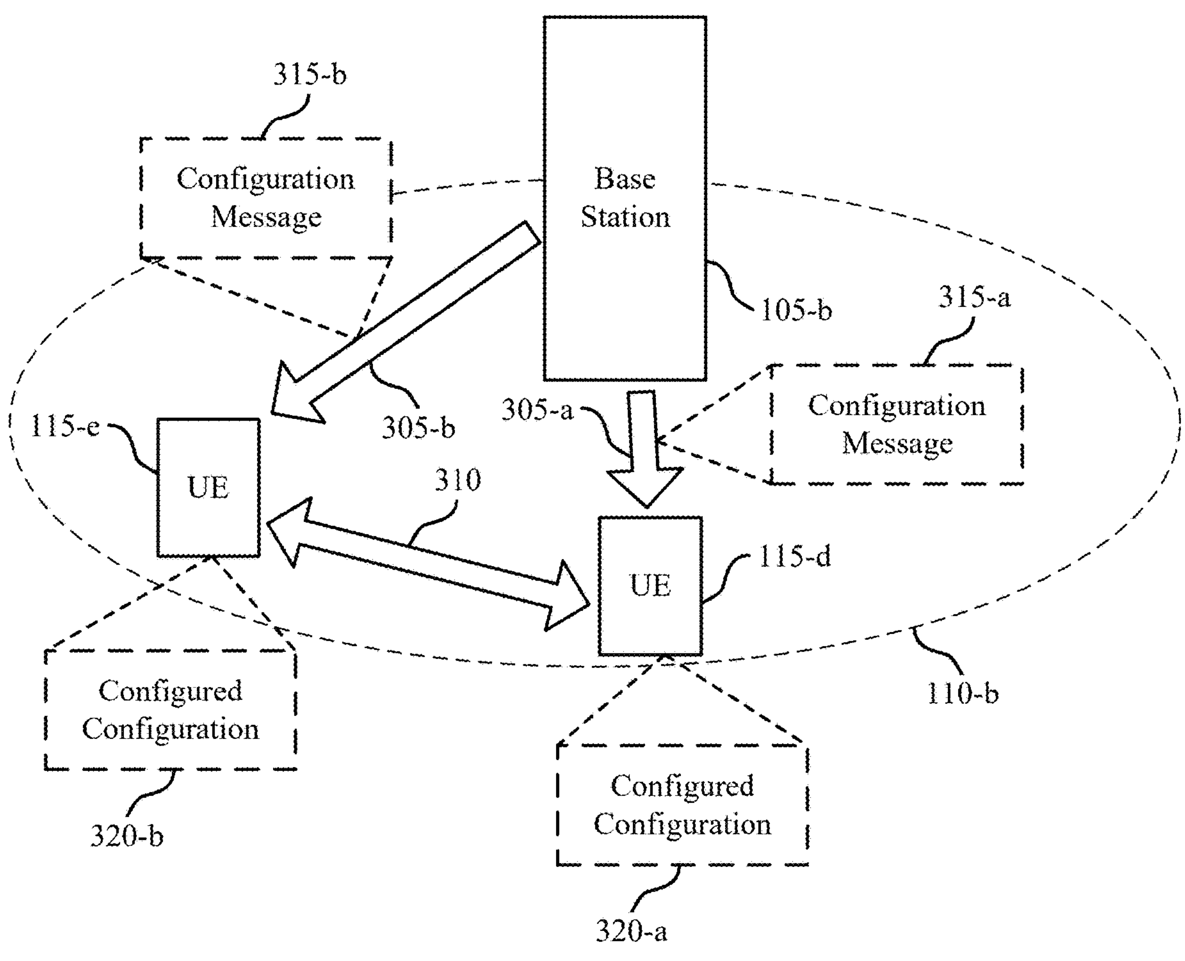

FIG. 3 illustrates an example of a wireless communications system 300 that supports cellular assisted sidelink discovery, in accordance with one or more aspects of the present disclosure. The wireless communications system 300 may be an example or include aspects of a wireless communications system 100, a wireless communications system 200, or both. For example, the wireless communications system 300 may include a base station 105-*b*, a UE 115-*d*, and a UE 115-*e*, which may be examples of the corresponding devices described with reference to FIGS. 1 and 2. The base station 105-*b* may provide services to a coverage area 110-*b*. The UEs 115 may determine one or more Uu signals (e.g., uplink messages) that support UE detection in a first frequency range (e.g., FR1 or another relatively "low" frequency spectrum) to support sidelink discovery in a second frequency range (e.g., FR2 or another relatively "high" frequency spectrum as compared to the first frequency range). For example, each UE 115 may include a configuration configuring one or more signals in the first frequency range to support Uu assisted sidelink discovery.

In some examples, a base station 105-*b* may configure the one or more uplink messages that support detection of a UE 115 in the first frequency range to support sidelink discovery in the second frequency range. The base station 105-*b* may provide a signal configuration over a Uu link to one or more UEs 115 within the coverage area 110-*b* of the base station 105-*b*. For example, the base station 105-*b* may transmit a configuration message 315-*a* to the UE 115-*d* (e.g., over a downlink connection 305-*a*). The configuration message 315-*a* may be an example of an RRC message or another configuration message. In some cases, based on dynamically configuring the uplink messages that support detection of a UE 115 in the first frequency range, the base station 105-*b* may flexibly determine an uplink message to assist with sidelink discovery. For example, the base station 105-*b* may configure a signal that is not currently being used for cellular data communication to support UE detection in the first frequency range and assist with sidelink discovery. The base station 105-*b* may additionally coordinate resources and signals across UEs 115 in the wireless communications system 300 (e.g., using cross-link interference resource configuration) to improve UE detection in the first frequency range.

The configuration message 315-*a* may include one or more fields indicating information associated with the uplink message for Uu assisted sidelink discovery. The configuration message 315-*a* may include a first field (e.g., a bit field or flag) indicating that the uplink message supports usage for Uu assisted sidelink discovery. The configuration message 315-*a* may include one or more fields indicating a time domain resource configuration for the uplink message. For example, the time domain resource configuration may include a signaling periodicity, a slot index, a symbol index, or a combination thereof for the uplink message. The configuration message 315-*a* may additionally or alternatively include one or more fields indicating a frequency domain resource configuration for the uplink message. For example, the frequency domain resource configuration may include a bandwidth or BWP, a resource block pattern (e.g., if the signal is transmitted on a subset of resource blocks within the bandwidth), a resource element pattern (e.g., if the signal is transmitted on a subset of resource elements within each resource block), or a combination thereof. The configuration message 315-*a* may additionally or alternatively include one or more fields indicating signal generation information, such as a sequence, an initial state of a sequence generator for the signal, scrambling information for the sequence, or a combination thereof. In some examples, the configuration message 315-*a* may include a field indicating a detection threshold for detecting the uplink message (e.g., a threshold value for a signal metric). Additionally or alternatively, the configuration message 315-*a* may include one or more fields indicating the type of uplink message (e.g., SRS, RACH preamble, PUSCH, PUCCH, uplink DMRS) that supports Uu assisted sidelink discovery, whether the configuration is UE-specific or common to multiple UEs, or some combination thereof.

A UE 115-*d* may use the indicated information to determine timing, frequency resources, signal information, a detection threshold, or a combination thereof for monitoring for the uplink message. A UE 115-*e* (e.g., a UE 115 receiving an uplink grant to transmit the uplink message) may use the indicated information to determine timing, frequency resources, signal information, or a combination thereof for transmitting the uplink message over the Uu interface.

In some examples, a UE 115 (e.g., UE 115-*e*) may transmit a reporting message to the base station 105-*b* indicating that the UE 115-*e* is available for sidelink communications in the second frequency range. For example, the reporting message may include a flag indicating the UE's interest in sidelink communications in FR2. The base station 105-*b* may transmit the configuration message 315-*b* to the UE 115-*e* in response to the reporting message. In some examples, the base station 105-*b* may scale the number of resources supporting UE detection in the first frequency range to assist with sidelink discovery in the second frequency range based on the UE's reporting message.

Additionally or alternatively, the configuration may be pre-defined at a UE 115. For example, the UE 115-*d* may store a configured configuration 320-*a* indicating the one or more uplink messages that support detection of a UE 115 in the first frequency range to support sidelink discovery in the second frequency range. Accordingly, the UE 115-*d* may determine an uplink message supporting Uu assisted sidelink discovery even if the UE 115-*d* is outside of network coverage. That is, the UE 115-*d* may determine the uplink message based on the configured configuration 320-*a* for the UE 115-*d*, as opposed to a configuration message 315-*a* received from a base station 105-*b*. In some examples, the UE 115-*d* may support both configurations. For example, the UE 115-*d* may store a configured configuration 320-*a* representing a default configuration for the UE 115-*d*. However, the base station 105-*b* may dynamically update the configuration using a configuration message 315-*a*. In some cases, the UE 115-*d* and the UE 115-*e* may store a same configured configuration 320 (e.g., a common configuration). In some other cases, the UE 115-*d* may store a configured configuration 320-*a* and the UE 115-*e* may store a configured configuration 320-*b* different from the configured configuration 320-*a*.

The configured configuration 320-*a* may include one or more parameters indicating information associated with the uplink message for Uu assisted sidelink discovery. The configured configuration 320-*a* may include one or more parameters indicating a time domain resource configuration for the uplink message. For example, the time domain resource configuration may include a signaling periodicity, a slot index, a symbol index, or a combination thereof for the uplink message. The configured configuration 320-*a* may additionally or alternatively include one or more parameters indicating a frequency domain resource configuration for the uplink message. For example, the frequency domain resource configuration may include a bandwidth or BWP, a resource block pattern (e.g., if the signal is transmitted on a subset of resource blocks within the bandwidth), a resource element pattern (e.g., if the signal is transmitted on a subset of resource elements within each resource block), or a combination thereof. The configured configuration 320-*a* may additionally or alternatively include one or more parameters indicating signal generation information, such as a sequence, an initial state of a sequence generator for the signal, scrambling information for the sequence, or a combination thereof. In some examples, the configured configuration 320-*a* may define a detection threshold for detecting the uplink message (e.g., a threshold value for a signal metric). Additionally or alternatively, the configured configuration 320-*a* may indicate the type of uplink message (e.g., SRS, RACH preamble, PUSCH, PUCCH, uplink DMRS) that supports Uu assisted sidelink discovery, whether the configuration is UE-specific or common to multiple UEs, or some combination thereof.

In some examples, the configuration may be UE-specific. For example, an uplink message supporting Uu assisted sidelink discovery may be associated with a specific UE (e.g., UE 115-*e*). In some cases, the base station 105-*b* may configure each UE 115 with a specific configuration. For example, the base station 105-*b* may transmit the configuration message 315-*a* on the downlink connection 305-*a* to the UE 115-*d* to configure the UE 115-*d* with a UE-specific configuration and may transmit the configuration message 315-*b* on the downlink connection 305-*b* to the UE 115-*e* to configure the UE 115-*e* with a UE-specific configuration.

The base station 105-*b* may further indicate the UE-specific configurations for other UEs 115 using the configuration messages 315. For example, the base station 105-*b* may indicate the UE-specific configuration of the UE 115-*e* to the UE 115-*d*. In this way, the UE 115-*d* may monitor for the uplink message configured to support Uu assisted sidelink discovery of the UE 115-*e*. If the UE 115-*d* detects the uplink message, the UE 115-*d* may specifically determine that UE 115-*e*—and not any UE 115—is within a detection range of the UE 115-*d*. In some cases, if the UEs 115 store configured configurations 320, the configured configurations 320 may support UE-specific configurations based on the UE identities. For example, the configured configuration 320-*a* may include a set of signals supporting Uu assisted sidelink discovery and one or more associations between a signal and a corresponding UE identity.

In some other examples, the configuration may be common to multiple UEs. Accordingly, multiple UEs 115 may transmit the same uplink message (e.g., Uu signal) supporting UE discovery in the first frequency range. In some cases, the base station 105-*b* may transmit a configuration message 315 configuring one or more uplink messages to support Uu assisted sidelink discovery (e.g., to multiple UEs 115, such as the UE 115-*d* and the UE 115-*e*). In the configuration message 315, the base station 105-*b* may refrain from indicating a specific UE 115 or may indicate a group of UEs 115 (e.g., using a group identifier) for which the uplink message is configured. In some cases, if the UEs 115 store configured configurations 320, the configured configurations 320 may define one or more uplink messages that support Uu assisted sidelink discovery, where different UEs 115 may select the same uplink message from the defined set of uplink messages to use for UE discovery in the first frequency range. If the configuration is common to multiple UEs, the Uu signals may be examples of single frequency network (SFN) type signals, where a UE 115-*e* may transmit one of the Uu signals to indicate the presence of a UE 115 to other UEs 115 in the wireless communications system 300.

In some cases, the configuration may define, for a UE 115, multiple Uu signals supporting UE detection in the first frequency range. If multiple Uu signals are configured, the UE 115 may randomly or pseudo-randomly select a signal or a subset of signals to transmit from the configured set of Uu signals to support UE detection. A set of multiple Uu signals may be configured for a specific UE 115 or may be configured common to multiple UEs 115, as described herein.

Additionally or alternatively, if the UE 115 is configured with multiple Uu signals supporting UE detection in the first frequency range, the UE 115 may use a time domain pattern for transmitting different signals of the configured Uu signals. In some examples, the time domain pattern may be configured by the base station 105-*b*. In some other examples, the time domain pattern may be pre-configured at the UE 115. The time domain pattern may indicate timing for the UE 115 to transmit each signal of a set of signals. For example, if the UE 115-*e* is configured with three Uu signals supporting UE detection in the first frequency range, the UE 115-*e* may transmit the three Uu signals in different TTIs (e.g., different symbols, different slots) according to the configured time domain pattern. Additionally, if a different UE 115 is configured with the same three Uu signals, the different UE 115 may use a different time domain pattern such that the different UE 115 transmits a different signal than the UE 115-*e* in a same TTI. Accordingly, one or more time domain patterns configured for a set of UEs 115 may support each UE 115 using a different Uu signal to support UE detection in a TTI (e.g., a slot).

In some examples, the configuration may be based on one or more capabilities of the UEs 115. For example, for half-duplex UEs 115, the configuration may multiplex UEs such that the UEs 115 can detect Uu signaling by the other UEs 115. For example, if the UE 115-*d* and the UE 115-*e* are half-duplex UEs and the configuration configures the UEs 115 to both transmit Uu signals supporting UE detection in the first frequency range with a first slot, the configuration may refrain from configuring both UEs 115 to transmit the Uu signals in a subsequent slot. Instead, one UE 115 may transmit and the other UE 115 may monitor in the subsequent slot, such that the configuration supports UE detection for half-duplex UEs 115. In some cases, the configuration may use Latin square-based resource allocation to coordinate resources for the Uu signaling to support half-duplex operations.

The UE 115-*e* may transmit an uplink message (e.g., a Uu signal) to the base station 105-*b*. In some examples, the UE 115-*e* may determine the uplink message to transmit based on the configuration. The UE 115-*d* may monitor for the uplink message based on the configuration. For example, the UE 115-*d* may monitor for a specific uplink message or a specific set of uplink messages based on a configuration message 315-*a*, a configured configuration 320-*a*, or both. If the UE 115-*d* detects the uplink message transmission (e.g., detects a signal metric corresponding to the Uu signal satisfying a configured threshold value), the UE 115-*d* may detect the presence of a UE 115 in the first frequency range proximate to the UE 115-*d*. If the configuration for the detected uplink message is UE-specific, the UE 115-*d* may specifically determine the presence of the UE 115-*e*. If the configuration for the detected uplink message is common to a set of multiple UEs 115, the UE 115-*d* may determine that at least one UE 115 of the set of multiple UEs 115 is within the detection range of the UE 115-*d*. The UE 115-*d* may trigger sidelink beamforming and UE discovery in the second frequency range (e.g., FR2) based on detecting at least one UE 115 proximate to the UE 115-*d* in the first frequency range (e.g., FR1). Based on the configuration, the UE 115-*d* may detect UE 115-*e* and establish a sidelink connection 310 for sidelink communications in the second frequency range with the detected UE 115-*e*.

Figure 4:
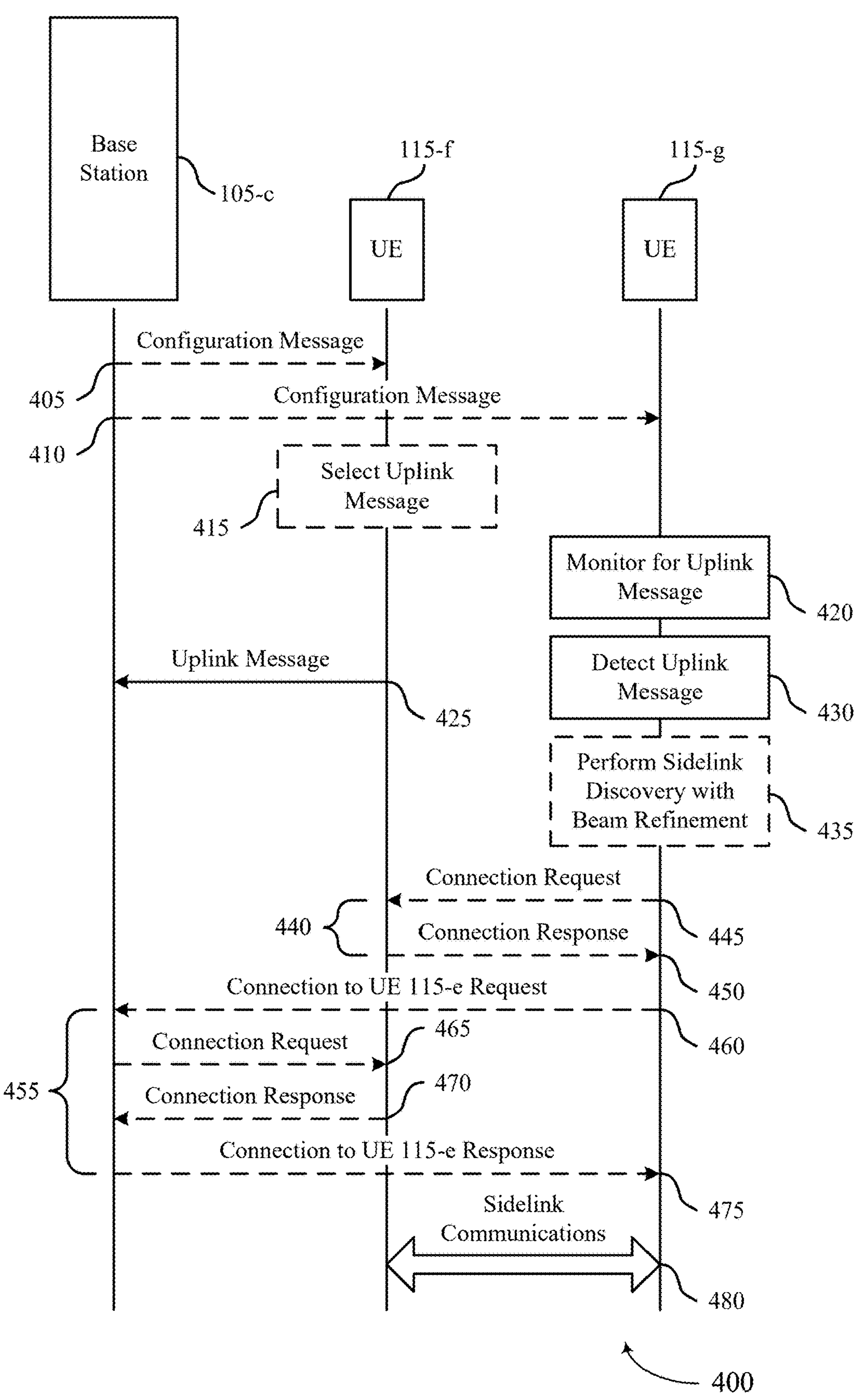
FIG. 4 illustrates an example of a process flow that supports cellular assisted sidelink discovery, in accordance with one or more aspects of the present disclosure.

FIG. 4 illustrates an example of a process flow 400 that supports cellular assisted sidelink discovery, in accordance with one or more aspects of the present disclosure. The process flow 400 may be implemented by a wireless communications system 100, a wireless communications system 200, a wireless communications system 300, or a combination thereof as described with reference to FIGS. 1 through 3. The process flow 400 may include a base station 105-*c*, a UE 115-*f*, and a UE 115-*g*, which may be examples of the corresponding devices described with reference to FIGS. 1 through 3. The UE 115-*g* may monitor for an uplink message supporting Uu assisted sidelink discovery. Alternative examples of the following may be implemented, where some processes are performed in a different order than described or are not performed at all. In some cases, processes may include additional features not mentioned below, or further processes may be added.

In some examples, at 405, 410, or both, the base station 105-*c* may provide a signal configuration to the UE 115-*f*, the UE 115-*g*, or both. For example, at 405, the base station 105-*c* may transmit a configuration message to the UE 115-*f*, the configuration message indicating an uplink message in a first frequency range supporting UE detection for sidelink discovery in a second frequency range. Additionally or alternatively, at 410, the base station 105-*c* may transmit a configuration message to the UE 115-*g*, the configuration message indicating an uplink message in the first frequency range that supports UE detection for sidelink discovery in the second frequency range. The configuration message may be an example of an RRC message. The configuration message may include a flag indicating that the uplink message supports UE detection for sidelink discovery, a time domain resource configuration for the uplink message, a frequency domain resource configuration for the uplink message, a signal generation configuration for the uplink message, a detection threshold for detecting the uplink message, or a combination thereof. The configured uplink message may be an example of an SRS, a RACH preamble, a PUSCH message, a PUCCH message, an uplink DMRS, or any other Uu signal.

In some other examples, the UE 115-*f*, the UE 115-*g*, or both may be pre-configured with a configuration of the uplink message in the first frequency range that supports UE detection for sidelink discovery in the second frequency range.

At 415, the UE 115-*f* may select an uplink message for transmission. In some cases, the UE 115-*f* may select the uplink message from a set of uplink messages in the first frequency range configured to assist sidelink discovery in the second frequency range. The signal selection may be based on a selection rule, a selection parameter, a random or pseudo-random process, or some combination thereof.

The UE 115-*g* may determine the uplink message supporting UE detection for sidelink discovery based on the configuration at the UE 115-*g* (e.g., configured by the base station 105-*c* or pre-configured at the UE 115-*g*). At 420, the UE 115-*g* may monitor for the uplink message or for a set of uplink messages in the first frequency range (e.g., FR1 or another frequency range). The UE 115-*g* may monitor a Uu interface for the uplink message transmitted by another UE 115.

At 425, the UE 115-*f* may transmit, to the base station 105-*c*, the uplink message in the first frequency range. In some examples, the UE 115-*f* may transmit the uplink message to indicate that the UE 115-*f* is available for sidelink communications in the second frequency range. For example, the base station 105-*c* may allocate—or the UE 115-*f* may be configured with—a special resource (e.g., an SRS resource or another resource) that the UE 115-*f* may use to announce the presence of the UE 115-*f* and indicate that the UE 115-*f* is available for sidelink communication in the second frequency range. The special resource may be common among UEs 115 or specific to the UE 115-*f*.

At 430, the UE 115-*g* may detect the uplink message. For example, based on the monitoring, the UE 115-*g* may receive a signal metric for the uplink message (e.g., an RSRP value, an SNR value, an RSSI value) satisfying a signal metric threshold. Based on detecting the uplink message, the UE 115-*g* may detect the presence of the UE 115-*f* (e.g., discover the UE 115-*f* within a detection range of the UE 115-*g*).

In some examples, at 435, the UE 115-*g* may trigger a sidelink discovery procedure in the second frequency range based on detecting the uplink message for the UE 115-*f* in the first frequency range. The UE 115-*g* may be configured with a trigger condition specifying to perform the sidelink discovery based on detecting a UE 115 according to an uplink message. The UE 115-*g* may perform a beam refinement procedure (e.g., involving a beam sweep) in the second frequency range to determine a communication beam pair to use for sidelink communications with the UE 115-*f*. The communication beams used in the second frequency range may correspond to narrower beam widths than the communication beams used in the first frequency range. Accordingly, monitoring for the uplink message in the first frequency range may involve fewer beams and, correspondingly, a lower processing overhead and latency than monitoring for a sidelink discovery signal in the second frequency range.

In some examples, the UEs 115 may perform a UE-centric sidelink connection procedure 440. For example, the UE 115-*g* may request a sidelink connection with the UE 115-*f* directly over-the-air between the UEs 115. At 445, the UE 115-*g* may transmit a sidelink connection request to the UE 115-*f* based on detecting the UE 115-*f*. At 450, the UE 115-*f* may respond to the connection request with a sidelink connection response, and the UE 115-*f* and the UE 115-*g* may establish a sidelink connection for sidelink communications in the second frequency range.

In some other examples, the UEs 115 may perform a network-centric sidelink connection procedure 455. For example, the UEs 115 may exchange sidelink connection requests and responses through the base station 105-*c*. At 460, the UE 115-*g* may transmit a sidelink connection request indicating the UE 115-*f* to the base station 105-*c*. At 465, the base station 105-*c* may transmit (e.g., forward) the sidelink connection request to the UE 115-*f*. At 470, the UE 115-*f* may respond to the sidelink connection request by transmitting a sidelink connection response to the base station 105-*c*. At 475, the base station 105-*c* may transmit (e.g., forward) the sidelink connection response to the UE 115-*g* in response to the sidelink connection request. The UE 115-*f* and the UE 115-*g* may establish a sidelink connection for sidelink communications in the second frequency range based on the exchange of connection request and response messages via the base station 105-*c*.

At 480, the UE 115-*f* and the UE 115-*g* may communicate one or more sidelink messages in the second frequency range (e.g., FR2 or another frequency range at a higher frequency than the first frequency range) over the established sidelink connection.

Figure 5:
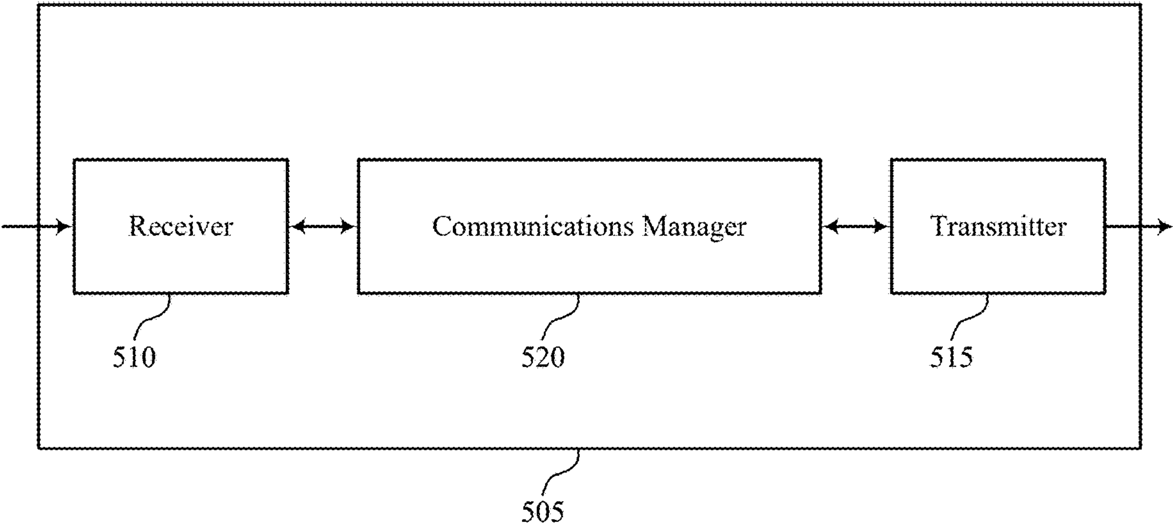
FIGS. 5 and 6 show block diagrams of devices that support cellular assisted sidelink discovery, in accordance with one or more aspects of the present disclosure.

FIG. 5 shows a block diagram 500 of a device 505 that supports cellular assisted sidelink discovery, in accordance with one or more aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to cellular assisted sidelink discovery). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to cellular assisted sidelink discovery). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of cellular assisted sidelink discovery as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a first UE in accordance with examples as disclosed herein. For example, the communications manager 520 may be configured as or otherwise support a means for determining, based on a configuration of the first UE, an uplink message supporting UE detection for sidelink discovery. The communications manager 520 may be configured as or otherwise support a means for monitoring for the uplink message in a first frequency range. The communications manager 520 may be configured as or otherwise support a means for detecting a second UE based on the monitoring. The communications manager 520 may be configured as or otherwise support a means for communicating a sidelink message with the second UE in a second frequency range different from the first frequency range based on detecting the second UE.

Additionally or alternatively, the communications manager 520 may support wireless communications at a first UE in accordance with examples as disclosed herein. For example, the communications manager 520 may be configured as or otherwise support a means for determining an uplink message supporting detection of the first UE for sidelink discovery. The communications manager 520 may be configured as or otherwise support a means for transmitting, to a base station, the uplink message in a first frequency range. The communications manager 520 may be configured as or otherwise support a means for communicating a sidelink message with a second UE in a second frequency range different from the first frequency range based on the uplink message supporting detection of the first UE for sidelink discovery.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for improving processing overhead and latency involved in sidelink discovery. For example, by triggering a sidelink discovery procedure in a second frequency range (e.g., FR2) based on detecting a second UE in a first frequency range (e.g., FR1), the communications manager 520 may reduce a number of sidelink discovery procedures performed in the second frequency range, especially if no UEs 115 are present within a detection proximity. Reducing the number of sidelink discovery procedures may reduce a number of times the processor ramps up processing power and turns on processing units to handle sidelink discovery. Additionally or alternatively, performing initial UE detection in the first frequency range, as opposed to the second (e.g., higher) frequency range), may support using wider beams for UE detection, resulting in reduced processing overhead and latency associated with a beam sweeping procedure.

Figure 6:
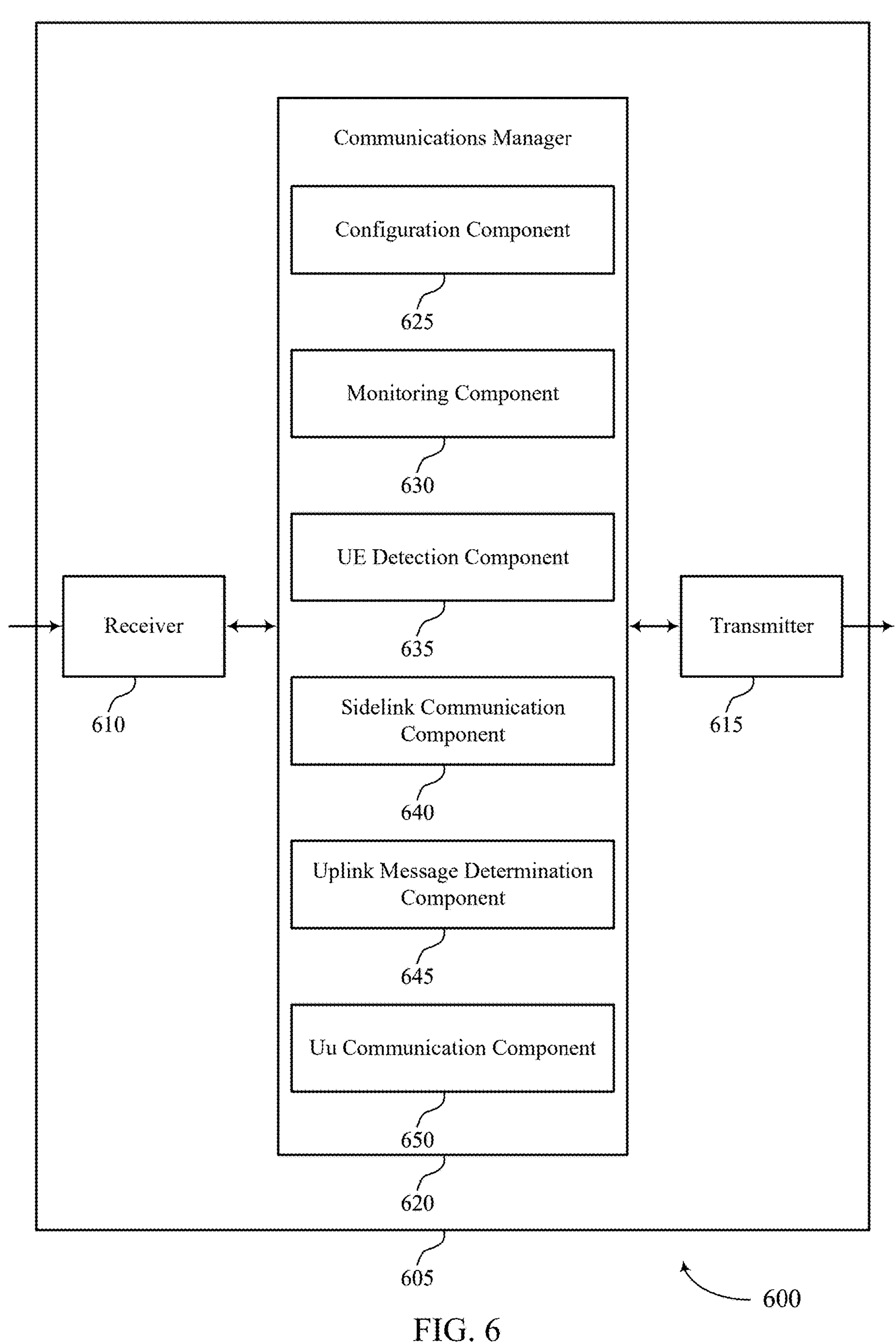

FIG. 6 shows a block diagram 600 of a device 605 that supports cellular assisted sidelink discovery, in accordance with one or more aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to cellular assisted sidelink discovery). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to cellular assisted sidelink discovery). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of cellular assisted sidelink discovery as described herein. For example, the communications manager 620 may include a configuration component 625, a monitoring component 630, a UE detection component 635, a sidelink communication component 640, an uplink message determination component 645, a Uu communication component 650, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a first UE in accordance with examples as disclosed herein. The configuration component 625 may be configured as or otherwise support a means for determining, based on a configuration of the first UE, an uplink message supporting UE detection for sidelink discovery. The monitoring component 630 may be configured as or otherwise support a means for monitoring for the uplink message in a first frequency range. The UE detection component 635 may be configured as or otherwise support a means for detecting a second UE based on the monitoring. The sidelink communication component 640 may be configured as or otherwise support a means for communicating a sidelink message with the second UE in a second frequency range different from the first frequency range based on detecting the second UE.

Additionally or alternatively, the communications manager 620 may support wireless communications at a first UE in accordance with examples as disclosed herein. The uplink message determination component 645 may be configured as or otherwise support a means for determining an uplink message supporting detection of the first UE for sidelink discovery. The Uu communication component 650 may be configured as or otherwise support a means for transmitting, to a base station, the uplink message in a first frequency range. The sidelink communication component 640 may be configured as or otherwise support a means for communicating a sidelink message with a second UE in a second frequency range different from the first frequency range based on the uplink message supporting detection of the first UE for sidelink discovery.

Figure 7:
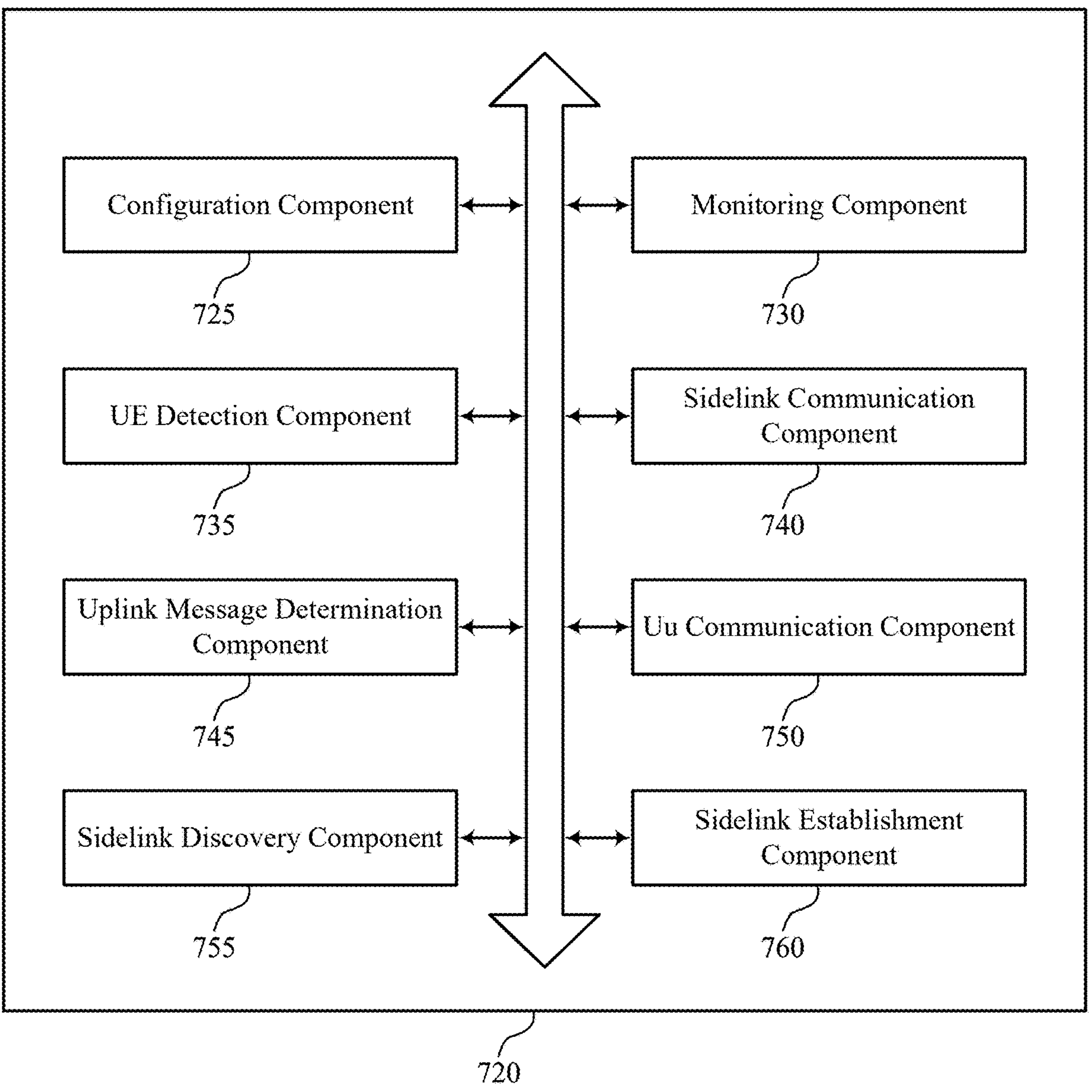
FIG. 7 shows a block diagram of a communications manager that supports cellular assisted sidelink discovery, in accordance with one or more aspects of the present disclosure.

FIG. 7 shows a block diagram 700 of a communications manager 720 that supports cellular assisted sidelink discovery, in accordance with one or more aspects of the present disclosure. The communications manager 720 may be an example of aspects of a communications manager 520, a communications manager 620, or both, as described herein. The communications manager 720, or various components thereof, may be an example of means for performing various aspects of cellular assisted sidelink discovery as described herein. For example, the communications manager 720 may include a configuration component 725, a monitoring component 730, a UE detection component 735, a sidelink communication component 740, an uplink message determination component 745, a Uu communication component 750, a sidelink discovery component 755, a sidelink establishment component 760, or any combination thereof. Each of these components may communicate, directly or indirectly, with one another (e.g., via one or more buses).

The communications manager 720 may support wireless communications at a first UE in accordance with examples as disclosed herein. The configuration component 725 may be configured as or otherwise support a means for determining, based on a configuration of the first UE, an uplink message supporting UE detection for sidelink discovery. The monitoring component 730 may be configured as or otherwise support a means for monitoring for the uplink message in a first frequency range. The UE detection component 735 may be configured as or otherwise support a means for detecting a second UE based on the monitoring. The sidelink communication component 740 may be configured as or otherwise support a means for communicating a sidelink message with the second UE in a second frequency range different from the first frequency range based on detecting the second UE.

In some examples, the configuration component 725 may be configured as or otherwise support a means for receiving, from a base station, a configuration message indicating the uplink message supporting UE detection for sidelink discovery, the determining based on the configuration message.

In some examples, the configuration message includes a flag indicating that the uplink message supports UE detection for sidelink discovery, a time domain resource configuration for the uplink message, a frequency domain resource configuration for the uplink message, a signal generation configuration for the uplink message, a detection threshold for detecting the uplink message, or a combination thereof. In some examples, the configuration message includes an RRC configuration message.

In some examples, the first UE is pre-configured with the configuration of the first UE indicating the uplink message supporting UE detection for sidelink discovery.

In some examples, the configuration of the first UE indicates that the uplink message supports UE detection for sidelink discovery, a time domain resource configuration for the uplink message, a frequency domain resource configuration for the uplink message, a signal generation configuration for the uplink message, a detection threshold for detecting the uplink message, or a combination thereof.

In some examples, the configuration component 725 may be configured as or otherwise support a means for determining that the uplink message corresponds to the second UE based on a UE-specific configuration for the uplink message supporting UE detection for sidelink discovery.

In some examples, the configuration component 725 may be configured as or otherwise support a means for determining that the uplink message corresponds to at least one UE of a set of multiple UEs based on a common configuration for the set of multiple UEs for the uplink message supporting UE detection for sidelink discovery, the set of multiple UEs including at least the second UE.

In some examples, the sidelink discovery component 755 may be configured as or otherwise support a means for triggering a sidelink discovery procedure in the second frequency range based on detecting the second UE. In some examples, the sidelink establishment component 760 may be configured as or otherwise support a means for establishing a sidelink connection with the second UE based on the sidelink discovery procedure, the sidelink message being communicated with the second UE via the established sidelink connection.

In some examples, the monitoring component 730 may be configured as or otherwise support a means for detecting the uplink message using a first communication beam in the first frequency range based on the monitoring. In some examples, the sidelink discovery component 755 may be configured as or otherwise support a means for performing a beam sweeping procedure using a set of second communication beams in the second frequency range based on the triggered sidelink discovery procedure, the first communication beam including a first beam width that is greater than each beam width for the set of second communication beams.

In some examples, to support establishing the sidelink connection with the second UE, the sidelink establishment component 760 may be configured as or otherwise support a means for transmitting a sidelink connection request to the second UE based on detecting the second UE. In some examples, to support establishing the sidelink connection with the second UE, the sidelink establishment component 760 may be configured as or otherwise support a means for receiving a sidelink connection response from the second UE in response to the sidelink connection request.

In some examples, to support establishing the sidelink connection with the second UE, the sidelink establishment component 760 may be configured as or otherwise support a means for transmitting, to a base station, a connection request indicating the second UE based on detecting the second UE. In some examples, to support establishing the sidelink connection with the second UE, the sidelink establishment component 760 may be configured as or otherwise support a means for receiving, from the base station, a connection response indicating the second UE in response to the connection request.

In some examples, to support monitoring, the UE detection component 735 may be configured as or otherwise support a means for detecting the uplink message based on a signal metric for the uplink message satisfying a signal metric threshold, the second UE being detected based on detecting the uplink message. In some examples, the signal metric includes an RSRP, an SNR, an RSSI, or a combination thereof.

In some examples, the monitoring component 730 may be configured as or otherwise support a means for monitoring for an additional uplink message in the first frequency range, the monitoring for the uplink message and the monitoring for the additional uplink message being based on a configured time domain pattern for at least the uplink message and the additional uplink message.

In some examples, the uplink message includes an SRS, a RACH preamble, a PUSCH message, a PUCCH message, an uplink DMRS, or a combination thereof.

In some examples, the first UE and the second UE support Uu communications in the first frequency range. In some examples, the first UE and the second UE support sidelink communications in the second frequency range. In some examples, the first frequency range includes FR1. In some examples, the second frequency range includes FR2.

Additionally or alternatively, the communications manager 720 may support wireless communications at a first UE in accordance with examples as disclosed herein. The uplink message determination component 745 may be configured as or otherwise support a means for determining an uplink message supporting detection of the first UE for sidelink discovery. The Uu communication component 750 may be configured as or otherwise support a means for transmitting, to a base station, the uplink message in a first frequency range. In some examples, the sidelink communication component 740 may be configured as or otherwise support a means for communicating a sidelink message with a second UE in a second frequency range different from the first frequency range based on the uplink message supporting detection of the first UE for sidelink discovery.

In some examples, the configuration component 725 may be configured as or otherwise support a means for receiving, from the base station, a configuration message indicating that the uplink message supports UE detection for sidelink discovery, the determining based on the configuration message.

In some examples, to support determining, the configuration component 725 may be configured as or otherwise support a means for determining the uplink message from a configured set of uplink messages supporting UE detection for sidelink discovery based on a UE identifier for the first UE or a pseudorandom selection process or both.

Figure 8:
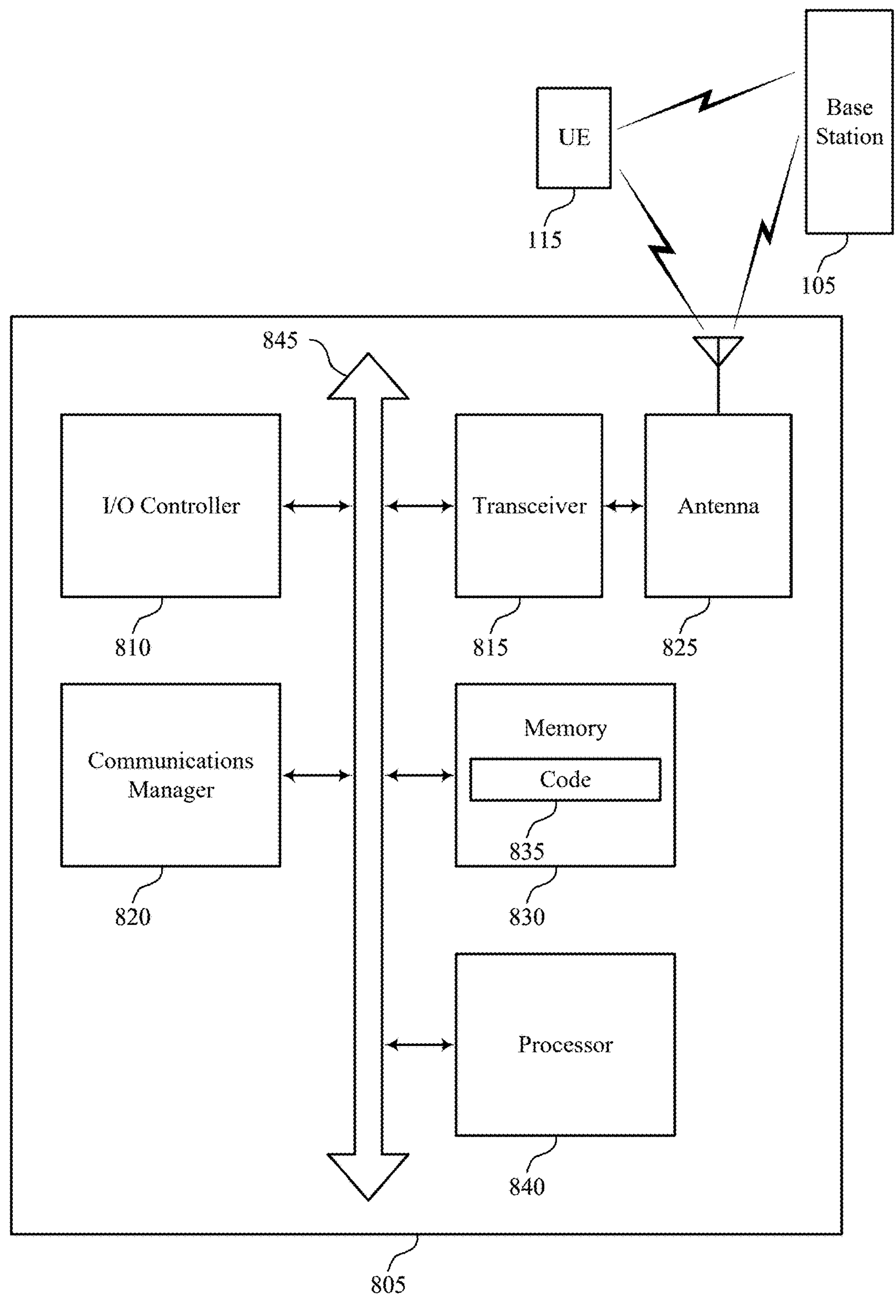
FIG. 8 shows a diagram of a system including a device that supports cellular assisted sidelink discovery, in accordance with one or more aspects of the present disclosure.

FIG. 8 shows a diagram of a system 800 including a device 805 that supports cellular assisted sidelink discovery, in accordance with one or more aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting cellular assisted sidelink discovery). For example, the device 805 or a component of the device 805 may include a processor 840 and memory 830 coupled to the processor 840, the processor 840 and memory 830 configured to perform various functions described herein.

The communications manager 820 may support wireless communications at a first UE in accordance with examples as disclosed herein. For example, the communications manager 820 may be configured as or otherwise support a means for determining, based on a configuration of the first UE, an uplink message supporting UE detection for sidelink discovery. The communications manager 820 may be configured as or otherwise support a means for monitoring for the uplink message in a first frequency range. The communications manager 820 may be configured as or otherwise support a means for detecting a second UE based on the monitoring. The communications manager 820 may be configured as or otherwise support a means for communicating a sidelink message with the second UE in a second frequency range different from the first frequency range based on detecting the second UE.

Additionally or alternatively, the communications manager 820 may support wireless communications at a first UE in accordance with examples as disclosed herein. For example, the communications manager 820 may be configured as or otherwise support a means for determining an uplink message supporting detection of the first UE for sidelink discovery. The communications manager 820 may be configured as or otherwise support a means for transmitting, to a base station, the uplink message in a first frequency range. The communications manager 820 may be configured as or otherwise support a means for communicating a sidelink message with a second UE in a second frequency range different from the first frequency range based on the uplink message supporting detection of the first UE for sidelink discovery.

By including or configuring the communications manager 820 in accordance with examples as described herein, the device 805 may support techniques for reducing latency involved in establishing a sidelink connection and communicating sidelink information. Additionally or alternatively, the device 805 may reduce a channel overhead in a first frequency range by reusing uplink messaging for UE discovery (e.g., as opposed to using separate signals for UE discovery in the first frequency range).

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of cellular assisted sidelink discovery as described herein, or the processor 840 and the memory 830 may be otherwise configured to perform or support such operations.

Figure 9:
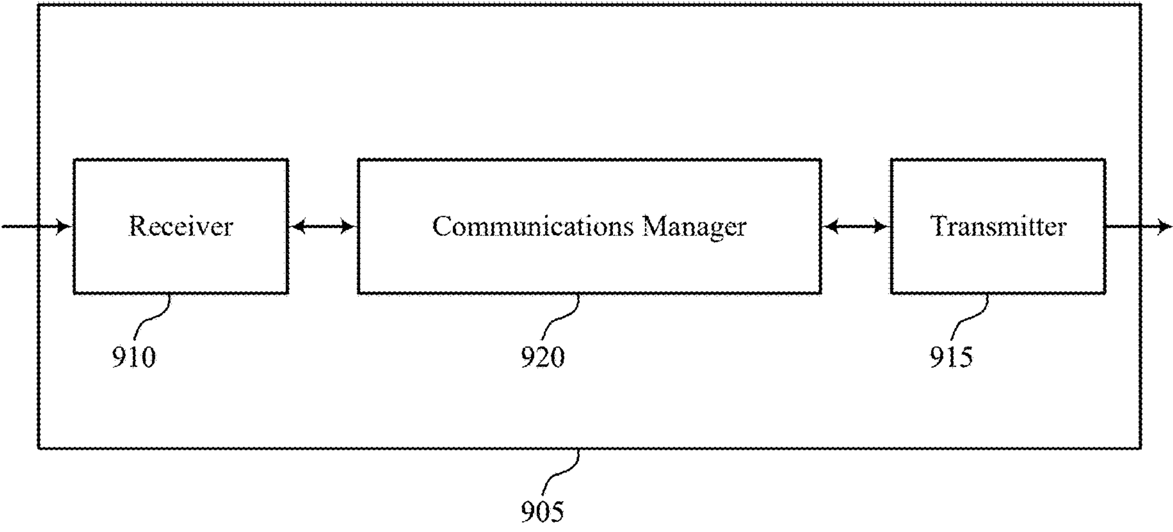
FIGS. 9 and 10 show block diagrams of devices that support cellular assisted sidelink discovery, in accordance with one or more aspects of the present disclosure.

FIG. 9 shows a block diagram 900 of a device 905 that supports cellular assisted sidelink discovery, in accordance with one or more aspects of the present disclosure. The device 905 may be an example of aspects of a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to cellular assisted sidelink discovery). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to cellular assisted sidelink discovery). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of cellular assisted sidelink discovery as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a base station in accordance with examples as disclosed herein. For example, the communications manager 920 may be configured as or otherwise support a means for transmitting, to at least a first UE, a configuration message indicating an uplink message supporting UE detection for sidelink discovery. The communications manager 920 may be configured as or otherwise support a means for receiving, from a second UE, the uplink message, the uplink message supporting sidelink discovery of the second UE at the first UE based on the configuration message.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for dynamically configuring uplink messages that support UE detection in a first frequency range. Accordingly, the device 905 may select uplink messages and resources that support efficient transmission and mitigate collisions, interference, or both in the first frequency range. Additionally or alternatively, the device 905 may coordinate configurations and resources between UEs 115 to improve channel usage and UE detection probability in the first frequency range.

Figure 10:
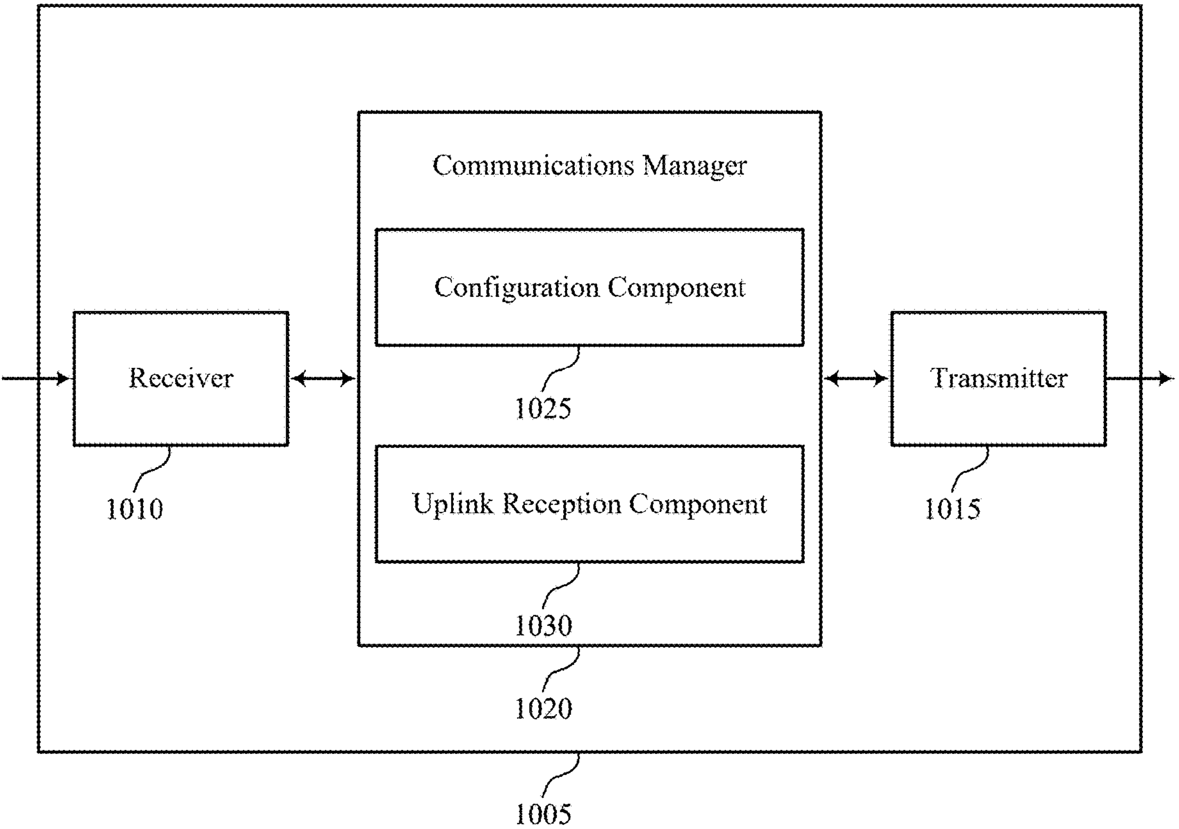

FIG. 10 shows a block diagram 1000 of a device 1005 that supports cellular assisted sidelink discovery, in accordance with one or more aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to cellular assisted sidelink discovery). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to cellular assisted sidelink discovery). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of cellular assisted sidelink discovery as described herein. For example, the communications manager 1020 may include a configuration component 1025 an uplink reception component 1030, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a base station in accordance with examples as disclosed herein. The configuration component 1025 may be configured as or otherwise support a means for transmitting, to at least a first UE, a configuration message indicating an uplink message supporting UE detection for sidelink discovery. The uplink reception component 1030 may be configured as or otherwise support a means for receiving, from a second UE, the uplink message, the uplink message supporting sidelink discovery of the second UE at the first UE based on the configuration message.

Figure 11:
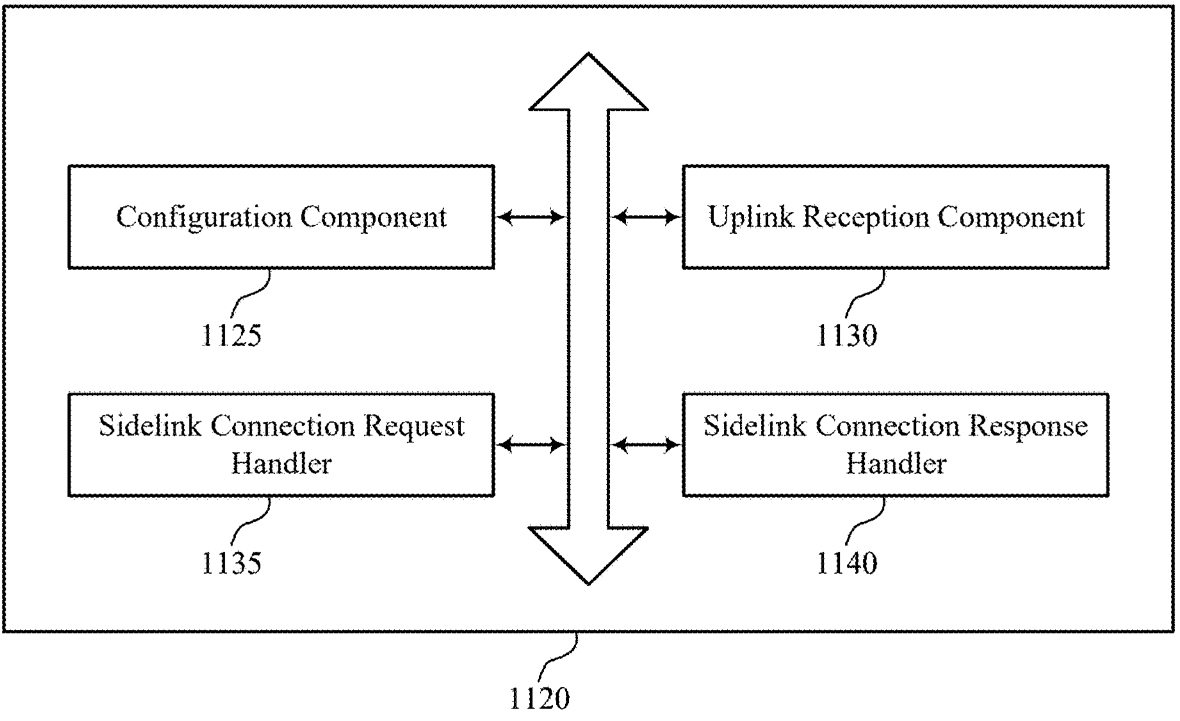
FIG. 11 shows a block diagram of a communications manager that supports cellular assisted sidelink discovery, in accordance with one or more aspects of the present disclosure.

FIG. 11 shows a block diagram 1100 of a communications manager 1120 that supports cellular assisted sidelink discovery, in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of cellular assisted sidelink discovery as described herein. For example, the communications manager 1120 may include a configuration component 1125, an uplink reception component 1130, a sidelink connection request handler 1135, a sidelink connection response handler 1140, or any combination thereof. Each of these components may communicate, directly or indirectly, with one another (e.g., via one or more buses).

The communications manager 1120 may support wireless communications at a base station in accordance with examples as disclosed herein. The configuration component 1125 may be configured as or otherwise support a means for transmitting, to at least a first UE, a configuration message indicating an uplink message supporting UE detection for sidelink discovery. The uplink reception component 1130 may be configured as or otherwise support a means for receiving, from a second UE, the uplink message, the uplink message supporting sidelink discovery of the second UE at the first UE based on the configuration message.

In some examples, the sidelink connection request handler 1135 may be configured as or otherwise support a means for receiving, from the first UE, a connection request indicating the second UE based on the uplink message. In some examples, the sidelink connection request handler 1135 may be configured as or otherwise support a means for transmitting, to the second UE, the connection request in response to receiving the connection request. In some examples, the sidelink connection response handler 1140 may be configured as or otherwise support a means for receiving, from the second UE, a connection response in response to transmitting the connection request. In some examples, the sidelink connection response handler 1140 may be configured as or otherwise support a means for transmitting, to the first UE, the connection response in response to receiving the connection request, the connection response supporting a sidelink connection between the first UE and the second UE.

In some examples, to support transmitting, the configuration component 1125 may be configured as or otherwise support a means for transmitting the configuration message to the first UE and the second UE, the uplink message being received from the second UE based on the configuration message.

In some examples, the configuration message indicates a UE-specific configuration for the second UE, the uplink message supporting detection of the second UE based on the UE-specific configuration.

In some examples, the configuration message indicates a common configuration for a set of multiple UEs including at least the second UE, the uplink message supporting detection of at least one UE of the set of multiple UEs based on the common configuration.

In some examples, the configuration message includes a flag indicating that the uplink message supports UE detection for sidelink discovery, a time domain resource configuration for the uplink message, a frequency domain resource configuration for the uplink message, a signal generation configuration for the uplink message, a detection threshold for detecting the uplink message, or a combination thereof. In some examples, the configuration message includes an RRC configuration message.

Figure 12:
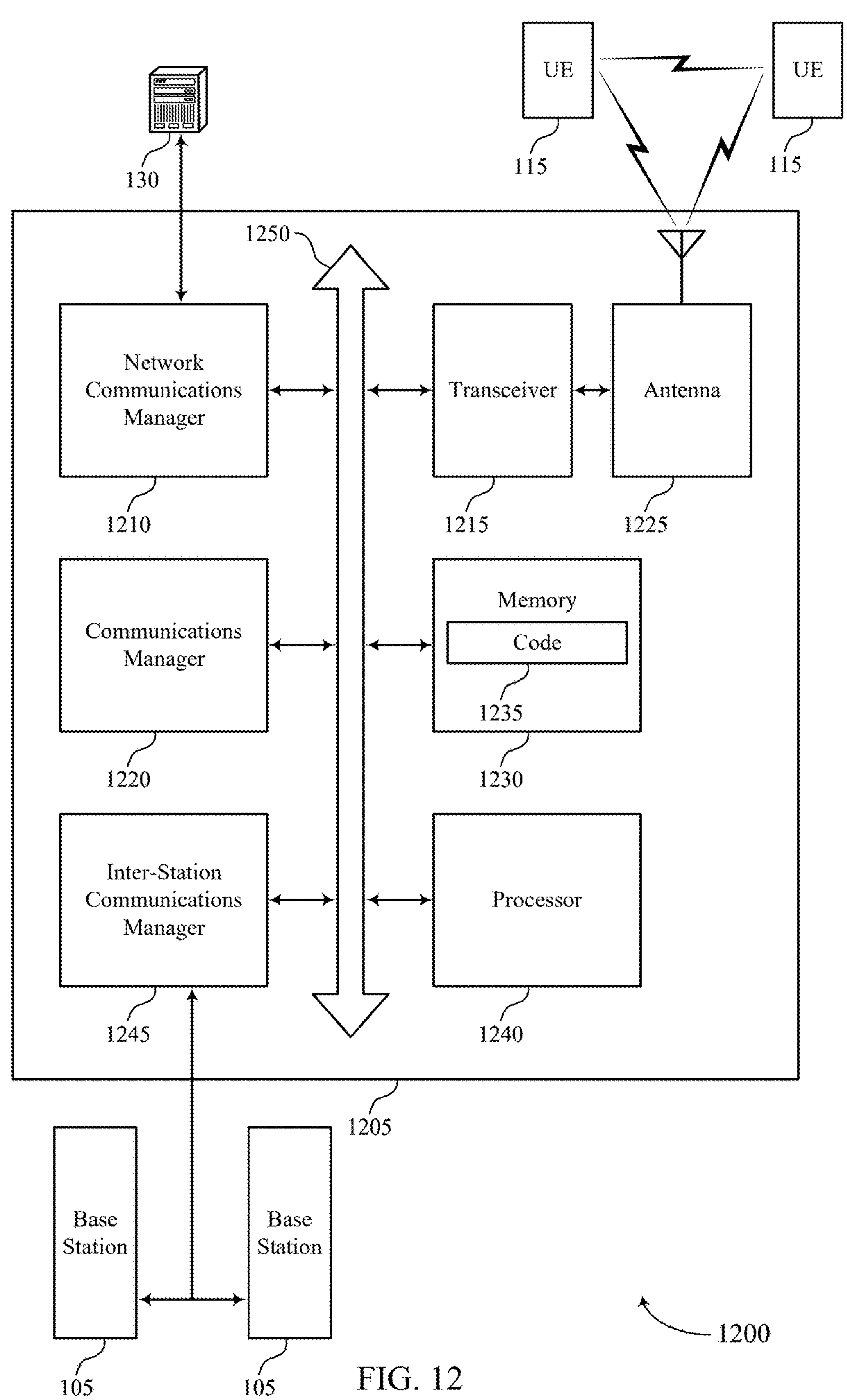
FIG. 12 shows a diagram of a system including a device that supports cellular assisted sidelink discovery, in accordance with one or more aspects of the present disclosure.

FIG. 12 shows a diagram of a system 1200 including a device 1205 that supports cellular assisted sidelink discovery, in accordance with one or more aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting cellular assisted sidelink discovery). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communications at a base station in accordance with examples as disclosed herein. For example, the communications manager 1220 may be configured as or otherwise support a means for transmitting, to at least a first UE, a configuration message indicating an uplink message supporting UE detection for sidelink discovery. The communications manager 1220 may be configured as or otherwise support a means for receiving, from a second UE, the uplink message, the uplink message supporting sidelink discovery of the second UE at the first UE based on the configuration message.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of cellular assisted sidelink discovery as described herein, or the processor 1240 and the memory 1230 may be otherwise configured to perform or support such operations.

Figure 13:
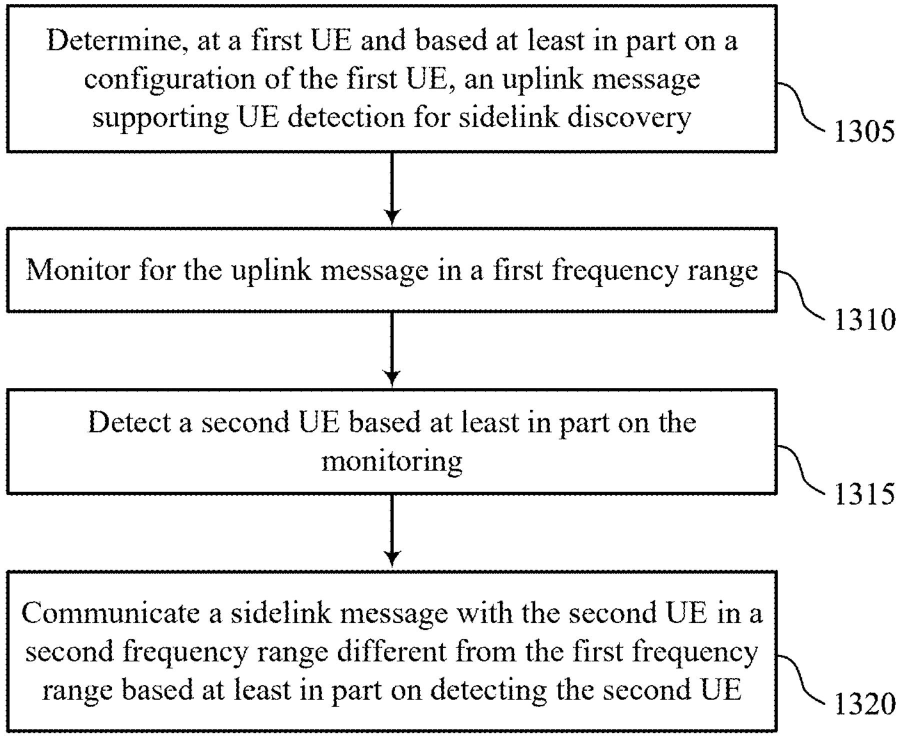
FIGS. 13 through 16 show flowcharts illustrating methods that support cellular assisted sidelink discovery, in accordance with one or more aspects of the present disclosure.

FIG. 13 shows a flowchart illustrating a method 1300 that supports cellular assisted sidelink discovery, in accordance with one or more aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include determining, based on a configuration of the first UE, an uplink message supporting UE detection for sidelink discovery. The operations of 1305 may be performed in accordance with examples as disclosed herein. In some examples, aspects of the operations of 1305 may be performed by a configuration component 725 as described with reference to FIG. 7.

At 1310, the method may include monitoring for the uplink message in a first frequency range. The operations of 1310 may be performed in accordance with examples as disclosed herein. In some examples, aspects of the operations of 1310 may be performed by a monitoring component 730 as described with reference to FIG. 7.

At 1315, the method may include detecting a second UE based on the monitoring. The operations of 1315 may be performed in accordance with examples as disclosed herein. In some examples, aspects of the operations of 1315 may be performed by a UE detection component 735 as described with reference to FIG. 7.

At 1320, the method may include communicating a sidelink message with the second UE in a second frequency range different from the first frequency range based on detecting the second UE. The operations of 1320 may be performed in accordance with examples as disclosed herein. In some examples, aspects of the operations of 1320 may be performed by a sidelink communication component 740 as described with reference to FIG. 7.

Figure 14:
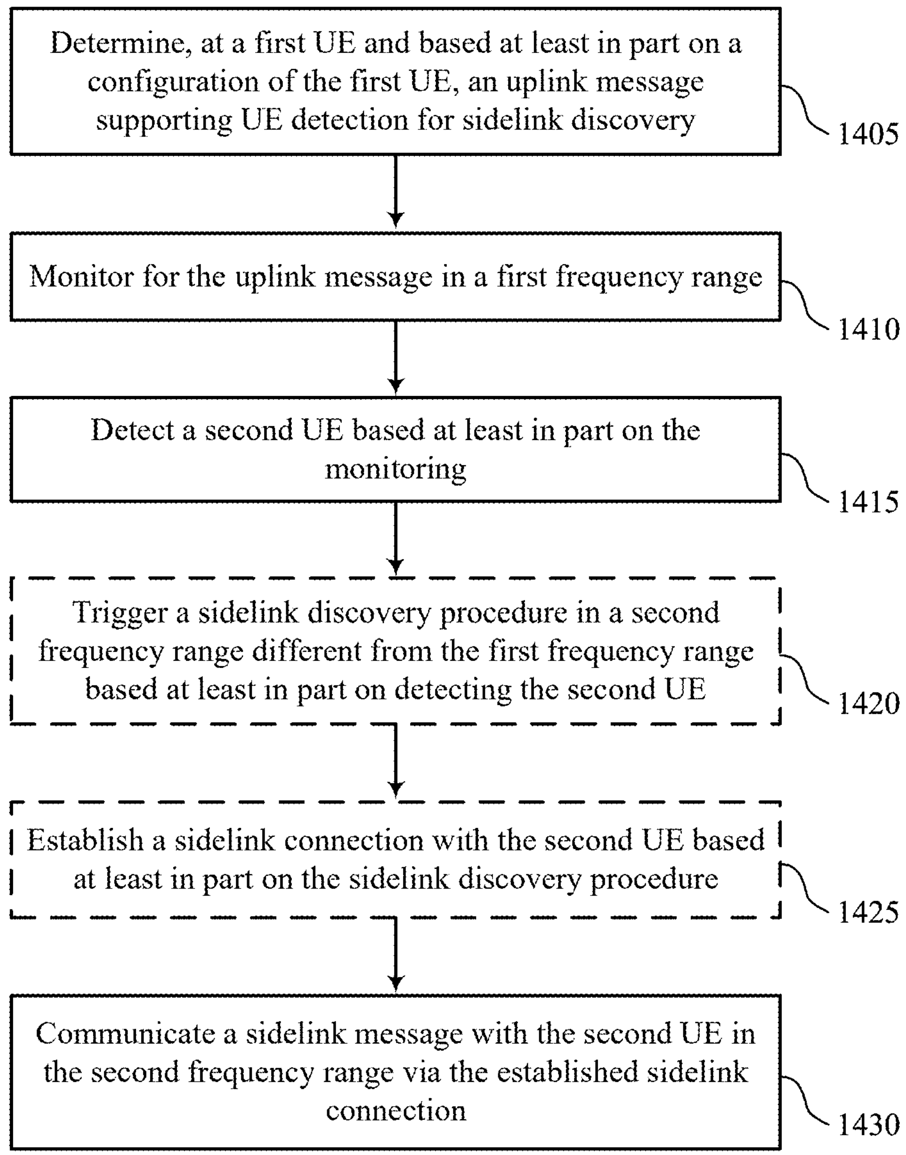

FIG. 14 shows a flowchart illustrating a method 1400 that supports cellular assisted sidelink discovery, in accordance with one or more aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include determining, based on a configuration of the first UE, an uplink message supporting UE detection for sidelink discovery. The operations of 1405 may be performed in accordance with examples as disclosed herein. In some examples, aspects of the operations of 1405 may be performed by a configuration component 725 as described with reference to FIG. 7.

At 1410, the method may include monitoring for the uplink message in a first frequency range. The operations of 1410 may be performed in accordance with examples as disclosed herein. In some examples, aspects of the operations of 1410 may be performed by a monitoring component 730 as described with reference to FIG. 7.

At 1415, the method may include detecting a second UE based on the monitoring. The operations of 1415 may be performed in accordance with examples as disclosed herein. In some examples, aspects of the operations of 1415 may be performed by a UE detection component 735 as described with reference to FIG. 7.

At 1420, the method may include triggering a sidelink discovery procedure in a second frequency range different from the first frequency range based on detecting the second UE. The operations of 1420 may be performed in accordance with examples as disclosed herein. In some examples, aspects of the operations of 1420 may be performed by a sidelink discovery component 755 as described with reference to FIG. 7.

At 1425, the method may include establishing a sidelink connection with the second UE based on the sidelink discovery procedure. The operations of 1425 may be performed in accordance with examples as disclosed herein. In some examples, aspects of the operations of 1425 may be performed by a sidelink establishment component 760 as described with reference to FIG. 7.

At 1430, the method may include communicating a sidelink message with the second UE in the second frequency range via the established sidelink connection. The operations of 1430 may be performed in accordance with examples as disclosed herein. In some examples, aspects of the operations of 1430 may be performed by a sidelink communication component 740 as described with reference to FIG. 7.

Figure 15:
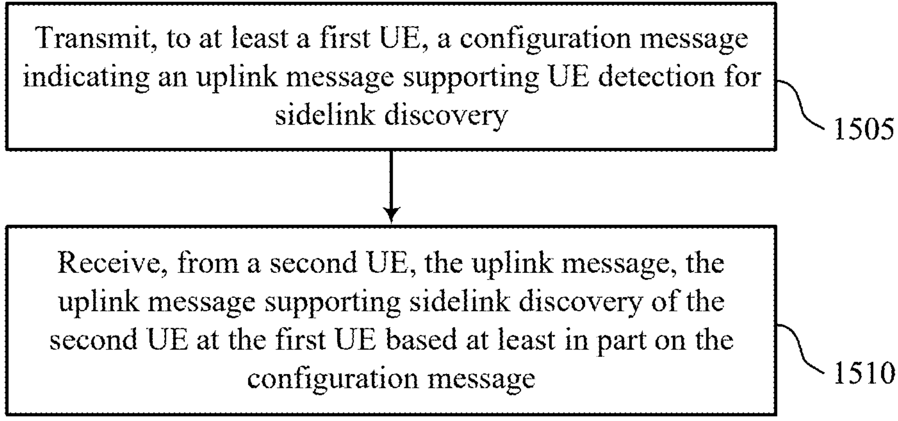

FIG. 15 shows a flowchart illustrating a method 1500 that supports cellular assisted sidelink discovery, in accordance with one or more aspects of the present disclosure. The operations of the method 1500 may be implemented by a base station or its components as described herein. For example, the operations of the method 1500 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1505, the method may include transmitting, to at least a first UE, a configuration message indicating an uplink message supporting UE detection for sidelink discovery. The operations of 1505 may be performed in accordance with examples as disclosed herein. In some examples, aspects of the operations of 1505 may be performed by a configuration component 1125 as described with reference to FIG. 11.

At 1510, the method may include receiving, from a second UE, the uplink message, the uplink message supporting sidelink discovery of the second UE at the first UE based on the configuration message. The operations of 1510 may be performed in accordance with examples as disclosed herein. In some examples, aspects of the operations of 1510 may be performed by an uplink reception component 1130 as described with reference to FIG. 11.

Figure 16:
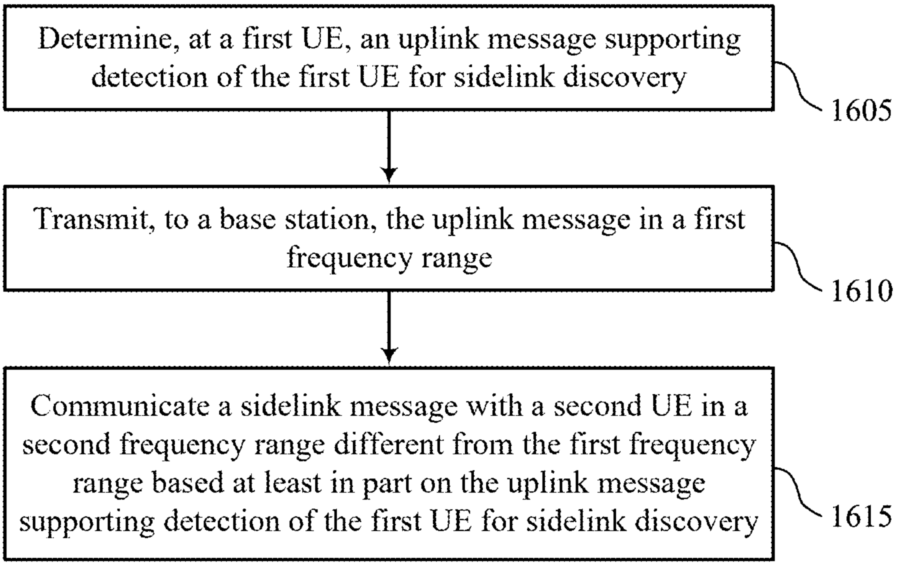

FIG. 16 shows a flowchart illustrating a method 1600 that supports cellular assisted sidelink discovery, in accordance with one or more aspects of the present disclosure. The operations of the method 1600 may be implemented by a UE or its components as described herein. For example, the operations of the method 1600 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1605, the method may include determining an uplink message supporting detection of the first UE for sidelink discovery. The operations of 1605 may be performed in accordance with examples as disclosed herein. In some examples, aspects of the operations of 1605 may be performed by an uplink message determination component 745 as described with reference to FIG. 7.

At 1610, the method may include transmitting, to a base station, the uplink message in a first frequency range. The operations of 1610 may be performed in accordance with examples as disclosed herein. In some examples, aspects of the operations of 1610 may be performed by a Uu communication component 750 as described with reference to FIG. 7.

At 1615, the method may include communicating a sidelink message with a second UE in a second frequency range different from the first frequency range based on the uplink message supporting detection of the first UE for sidelink discovery. The operations of 1615 may be performed in accordance with examples as disclosed herein. In some examples, aspects of the operations of 1615 may be performed by a sidelink communication component 740 as described with reference to FIG. 7.

The following provides an overview of aspects of the present disclosure:

Aspect 1: A method for wireless communications at a first UE, comprising: determining, based at least in part on a configuration of the first UE, an uplink message supporting UE detection for sidelink discovery; monitoring for the uplink message in a first frequency range; detecting a second UE based at least in part on the monitoring; and communicating a sidelink message with the second UE in a second frequency range different from the first frequency range based at least in part on detecting the second UE.

Aspect 2: The method of aspect 1, further comprising: receiving, from a base station, a configuration message indicating the uplink message supporting UE detection for sidelink discovery, the determining based at least in part on the configuration message.

Aspect 3: The method of aspect 2, wherein the configuration message comprises a flag indicating that the uplink message supports UE detection for sidelink discovery, a time domain resource configuration for the uplink message, a frequency domain resource configuration for the uplink message, a signal generation configuration for the uplink message, a detection threshold for detecting the uplink message, or a combination thereof.

Aspect 4: The method of any of aspects 2 through 3, wherein the configuration message comprises a radio resource control configuration message.

Aspect 5: The method of aspect 1, wherein the first UE is pre-configured with the configuration of the first UE indicating the uplink message supporting UE detection for sidelink discovery.

Aspect 6: The method of aspect 5, wherein the configuration of the first UE indicates that the uplink message supports UE detection for sidelink discovery, a time domain resource configuration for the uplink message, a frequency domain resource configuration for the uplink message, a signal generation configuration for the uplink message, a detection threshold for detecting the uplink message, or a combination thereof.

Aspect 7: The method of any of aspects 1 through 6, further comprising: determining that the uplink message corresponds to the second UE based at least in part on a UE-specific configuration for the uplink message supporting UE detection for sidelink discovery.

Aspect 8: The method of any of aspects 1 through 6, further comprising: determining that the uplink message corresponds to at least one UE of a plurality of UEs based at least in part on a common configuration for the plurality of UEs for the uplink message supporting UE detection for sidelink discovery, the plurality of UEs comprising at least the second UE.

Aspect 9: The method of any of aspects 1 through 8, further comprising: triggering a sidelink discovery procedure in the second frequency range based at least in part on detecting the second UE; and establishing a sidelink connection with the second UE based at least in part on the sidelink discovery procedure, the sidelink message being communicated with the second UE via the established sidelink connection.

Aspect 10: The method of aspect 9, further comprising: detecting the uplink message using a first communication beam in the first frequency range based at least in part on the monitoring; and performing a beam sweeping procedure using a set of second communication beams in the second frequency range based at least in part on the triggered sidelink discovery procedure, the first communication beam comprising a first beam width that is greater than each beam width for the set of second communication beams.

Aspect 11: The method of any of aspects 9 through 10, the establishing the sidelink connection with the second UE comprising: transmitting a sidelink connection request to the second UE based at least in part on detecting the second UE; and receiving a sidelink connection response from the second UE in response to the sidelink connection request.

Aspect 12: The method of any of aspects 9 through 10, the establishing the sidelink connection with the second UE comprising: transmitting, to a base station, a connection request indicating the second UE based at least in part on detecting the second UE; and receiving, from the base station, a connection response indicating the second UE in response to the connection request.

Aspect 13: The method of any of aspects 1 through 12, the monitoring comprising: detecting the uplink message based at least in part on a signal metric for the uplink message satisfying a signal metric threshold, the second UE being detected based at least in part on detecting the uplink message.

Aspect 14: The method of aspect 13, wherein the signal metric comprises a reference signal received power, a signal-to-noise ratio, a received signal strength indicator, or a combination thereof.

Aspect 15: The method of any of aspects 1 through 14, further comprising: monitoring for an additional uplink message in the first frequency range, the monitoring for the uplink message and the monitoring for the additional uplink message being based at least in part on a configured time domain pattern for at least the uplink message and the additional uplink message.

Aspect 16: The method of any of aspects 1 through 15, wherein the uplink message comprises a sounding reference signal, a random access preamble, a physical uplink shared channel message, a physical uplink control channel message, an uplink demodulation reference signal, or a combination thereof.

Aspect 17: The method of any of aspects 1 through 16, wherein: the first UE and the second UE support Uu communications in the first frequency range; and the first UE and the second UE support sidelink communications in the second frequency range.

Aspect 18: The method of any of aspects 1 through 17, wherein: the first frequency range comprises FR1; and the second frequency range comprises FR2.

Aspect 19: A method for wireless communications at a base station, comprising: transmitting, to at least a first UE, a configuration message indicating an uplink message supporting UE detection for sidelink discovery; and receiving, from a second UE, the uplink message, the uplink message supporting sidelink discovery of the second UE at the first UE based at least in part on the configuration message.

Aspect 20: The method of aspect 19, further comprising: receiving, from the first UE, a connection request indicating the second UE based at least in part on the uplink message; transmitting, to the second UE, the connection request in response to receiving the connection request; receiving, from the second UE, a connection response in response to transmitting the connection request; and transmitting, to the first UE, the connection response in response to receiving the connection request, the connection response supporting a sidelink connection between the first UE and the second UE.

Aspect 21: The method of any of aspects 19 through 20, the transmitting comprising: transmitting the configuration message to the first UE and the second UE, the uplink message being received from the second UE based at least in part on the configuration message.

Aspect 22: The method of any of aspects 19 through 21, wherein the configuration message indicates a UE-specific configuration for the second UE, the uplink message supporting detection of the second UE based at least in part on the UE-specific configuration.

Aspect 23: The method of any of aspects 19 through 21, wherein the configuration message indicates a common configuration for a plurality of UEs comprising at least the second UE, the uplink message supporting detection of at least one UE of the plurality of UEs based at least in part on the common configuration.

Aspect 24: The method of any of aspects 19 through 23, wherein the configuration message comprises a flag indicating that the uplink message supports UE detection for sidelink discovery, a time domain resource configuration for the uplink message, a frequency domain resource configuration for the uplink message, a signal generation configuration for the uplink message, a detection threshold for detecting the uplink message, or a combination thereof.

Aspect 25: The method of any of aspects 19 through 24, wherein the configuration message comprises a radio resource control configuration message.

Aspect 26: A method for wireless communications at a first UE, comprising: determining an uplink message supporting detection of the first UE for sidelink discovery; transmitting, to a base station, the uplink message in a first frequency range; and communicating a sidelink message with a second UE in a second frequency range different from the first frequency range based at least in part on the uplink message supporting detection of the first UE for sidelink discovery.

Aspect 27: The method of aspect 26, further comprising: receiving, from the base station, a configuration message indicating that the uplink message supports UE detection for sidelink discovery, the determining based at least in part on the configuration message.

Aspect 28: The method of any of aspects 26 through 27, the determining comprising: determining the uplink message from a configured set of uplink messages supporting UE detection for sidelink discovery based at least in part on a UE identifier for the first UE or a pseudorandom selection process or both.

Aspect 29: An apparatus for wireless communications at a first UE, comprising a processor; and memory coupled to the processor, the processor and memory configured to perform a method of any of aspects 1 through 18.

Aspect 30: An apparatus for wireless communications at a first UE, comprising at least one means for performing a method of any of aspects 1 through 18.

Aspect 31: A non-transitory computer-readable medium storing code for wireless communications at a first UE, the code comprising instructions executable by a processor to perform a method of any of aspects 1 through 18.

Aspect 32: An apparatus for wireless communications at a base station, comprising a processor; and memory coupled to the processor, the processor and memory configured to perform a method of any of aspects 19 through 25.

Aspect 33: An apparatus for wireless communications at a base station, comprising at least one means for performing a method of any of aspects 19 through 25.

Aspect 34: A non-transitory computer-readable medium storing code for wireless communications at a base station, the code comprising instructions executable by a processor to perform a method of any of aspects 19 through 25.

Aspect 35: An apparatus for wireless communications at a first UE, comprising a processor; and memory coupled to the processor, the processor and memory configured to perform a method of any of aspects 26 through 28.

Aspect 36: An apparatus for wireless communications at a first UE, comprising at least one means for performing a method of any of aspects 26 through 28.

Aspect 37: A non-transitory computer-readable medium storing code for wireless communications at a first UE, the code comprising instructions executable by a processor to perform a method of any of aspects 26 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a first user equipment (UE), comprising:

determining, based at least in part on a configuration of the first UE, an uplink message supporting UE detection for sidelink discovery, wherein the configuration indicates a time domain resource for the uplink message;

monitoring for the uplink message in a first frequency range according to the time domain resource;

detecting a second UE in accordance with receiving, at the first UE and over the time domain resource, the uplink message from the second UE based at least in part on the monitoring; and communicating a sidelink message with the second UE in a second frequency range different from the first frequency range based at least in part on detecting the second UE.

2. The method of claim 1, further comprising:

receiving a configuration message indicating the uplink message supporting UE detection for sidelink discovery, the determining based at least in part on the configuration message.

3. The method of claim 2, wherein the configuration message comprises a flag indicating that the uplink message supports UE detection for sidelink discovery, a time domain resource configuration for the uplink message that indicates the time domain resource, a frequency domain resource configuration for the uplink message, a signal generation configuration for the uplink message, a detection threshold for detecting the uplink message, or a combination thereof.

4. The method of claim 2, wherein the configuration message comprises a radio resource control configuration message.

5. The method of claim 1, wherein the first UE is pre-configured with the configuration of the first UE indicating the uplink message supporting UE detection for sidelink discovery.

6. The method of claim 5, wherein the configuration of the first UE indicates that the uplink message supports UE detection for sidelink discovery, a time domain resource configuration for the uplink message that indicates the time domain resource, a frequency domain resource configuration for the uplink message, a signal generation configuration for the uplink message, a detection threshold for detecting the uplink message, or a combination thereof.

7. The method of claim 1, further comprising:

determining that the uplink message corresponds to the second UE based at least in part on a UE-specific configuration for the uplink message supporting UE detection for sidelink discovery.

8. The method of claim 1, further comprising:

determining that the uplink message corresponds to at least one UE of a plurality of UEs based at least in part on a common configuration for the plurality of UEs for the uplink message supporting UE detection for sidelink discovery, the plurality of UEs comprising at least the second UE.

9. The method of claim 1, further comprising:

triggering a sidelink discovery procedure in the second frequency range based at least in part on detecting the second UE; and establishing a sidelink connection with the second UE based at least in part on the sidelink discovery procedure, the sidelink message being communicated with the second UE via the established sidelink connection.

10. The method of claim 9, further comprising:

detecting the uplink message using a first communication beam in the first frequency range based at least in part on the monitoring; and performing a beam sweeping procedure using a set of second communication beams in the second frequency range based at least in part on the triggered sidelink discovery procedure, the first communication beam comprising a first beam width that is greater than each beam width for the set of second communication beams.

11. The method of claim 9, the establishing the sidelink connection with the second UE comprising:

transmitting a sidelink connection request to the second UE based at least in part on detecting the second UE; and receiving a sidelink connection response from the second UE in response to the sidelink connection request.

12. The method of claim 9, the establishing the sidelink connection with the second UE comprising:

transmitting a connection request indicating the second UE based at least in part on detecting the second UE; and receiving a connection response indicating the second UE in response to the connection request.

13. The method of claim 1, the monitoring comprising:

detecting the uplink message based at least in part on a signal metric for the uplink message satisfying a signal metric threshold, the second UE being detected based at least in part on detecting the uplink message.

14. The method of claim 13, wherein the signal metric comprises a reference signal received power, a signal-to-noise ratio, a received signal strength indicator, or a combination thereof.

15. The method of claim 1, further comprising:

monitoring for an additional uplink message in the first frequency range, the monitoring for the uplink message and the monitoring for the additional uplink message being based at least in part on a configured time domain pattern for at least the uplink message and the additional uplink message.

16. The method of claim 1, wherein the uplink message comprises a sounding reference signal, a random access preamble, a physical uplink shared channel message, a physical uplink control channel message, an uplink demodulation reference signal, or a combination thereof.

17. The method of claim 1, wherein:

the first UE and the second UE support Uu communications in the first frequency range; and the first UE and the second UE support sidelink communications in the second frequency range.

18. The method of claim 1, wherein:

the first frequency range comprises Frequency Range 1 (FR1); and the second frequency range comprises Frequency Range 2 (FR2).

19. An apparatus for wireless communications at a first user equipment (UE), comprising:

one or more memories; and one or more processors coupled with the one or more memories and configured to cause the first UE to:

determine, based at least in part on a configuration of the first UE, an uplink message that supports UE detection for sidelink discovery, wherein the configuration indicates a time domain resource for the uplink message;

monitor for the uplink message in a first frequency range according to the time domain resource;

detect a second UE in accordance with a reception, at the first UE and over the time domain resource, of the uplink message from the second UE based at least in part on the monitored first frequency range; and communicate a sidelink message with the second UE in a second frequency range different from the first frequency range based at least in part on the detection of the second UE.

20. The apparatus of claim 19, further comprising:

an antenna, the one or more processors further configured to cause the first UE to:

receive, via the antenna, a configuration message that indicates the uplink message supports UE detection for sidelink discovery, the determination based at least in part on the configuration message.

21. The apparatus of claim 20, wherein the configuration message comprises a flag that indicates the uplink message supports UE detection for sidelink discovery, a time domain resource configuration for the uplink message that indicates the time domain resource, a frequency domain resource configuration for the uplink message, a signal generation configuration for the uplink message, a detection threshold for detection of the uplink message, or a combination thereof.

22. The apparatus of claim 19, wherein the first UE is pre-configured with the configuration of the first UE that indicates the uplink message supports UE detection for sidelink discovery.

23. The apparatus of claim 22, wherein the configuration of the first UE indicates that the uplink message supports UE detection for sidelink discovery, a time domain resource configuration for the uplink message that indicates the time domain resource, a frequency domain resource configuration for the uplink message, a signal generation configuration for the uplink message, a detection threshold for detection of the uplink message, or a combination thereof.

24. The apparatus of claim 19, wherein the one or more processors are further configured to cause the first UE to:

determine that the uplink message corresponds to the second UE based at least in part on a UE-specific configuration for the uplink message that supports UE detection for sidelink discovery.

25. The apparatus of claim 19, wherein the one or more processors are further configured to cause the first UE to:

determine that the uplink message corresponds to at least one UE of a plurality of UEs based at least in part on a common configuration for the plurality of UEs for the uplink message that supports UE detection for sidelink discovery, wherein the plurality of UEs comprises at least the second UE.

26. The apparatus of claim 19, wherein the one or more processors are further configured to cause the first UE to:

trigger a sidelink discovery procedure in the second frequency range based at least in part on the detection of the second UE; and establish a sidelink connection with the second UE based at least in part on the sidelink discovery procedure, wherein the sidelink message is communicated with the second UE via the established sidelink connection.

27. A non-transitory computer-readable medium storing code for wireless communication at a first user equipment (UE), the code comprising instructions executable by one or more processors to cause the first UE to:

determine, based at least in part on a configuration of the first UE, an uplink message supporting UE detection for sidelink discovery, wherein the configuration indicates a time domain resource for the uplink message;

monitor for the uplink message in a first frequency range according to the time domain resource;

detect a second UE in accordance with a reception, at the first UE and over the time domain resource, of the uplink message from the second UE based at least in part on the monitoring; and communicate a sidelink message with the second UE in a second frequency range different from the first frequency range based at least in part on the detection of the second UE.

28. The non-transitory computer-readable medium of claim 27, wherein the instructions are further executable by the one or more processors to cause the first UE to:

receive a configuration message indicating the uplink message supporting UE detection for sidelink discovery, the determining based at least in part on the configuration message.

29. The non-transitory computer-readable medium of claim 28, wherein the configuration message comprises a flag indicating that the uplink message supports UE detection for sidelink discovery, a time domain resource configuration for the uplink message that indicates the time domain resource, a frequency domain resource configuration for the uplink message, a signal generation configuration for the uplink message, a detection threshold for detecting the uplink message, or a combination thereof.

30. An apparatus for wireless communications at a first user equipment (UE), comprising:

means for determining, based at least in part on a configuration of the first UE, an uplink message supporting UE detection for sidelink discovery, wherein the configuration indicates a time domain resource for the uplink message;

means for monitoring for the uplink message in a first frequency range according to the time domain resource;

means for detecting a second UE in accordance with a reception, at the first UE and over the time domain resource, of the uplink message from the second UE based at least in part on the monitoring; and means for communicating a sidelink message with the second UE in a second frequency range different from the first frequency range based at least in part on the detection of the second UE.

* * * * *